(12) United States Patent
Tatara et al.

(10) Patent No.: US 11,066,009 B2
(45) Date of Patent: Jul. 20, 2021

(54) VEHICULAR ILLUMINATION DEVICE, VEHICLE SYSTEM, AND VEHICLE

(71) Applicant: KOITO MANUFACTURING CO., LTD., Tokyo (JP)

(72) Inventors: Naoki Tatara, Shizuoka (JP); Toshihiro Okamura, Shizuoka (JP); Takeshi Masuda, Shizuoka (JP); Naoki Takii, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/771,367

(22) PCT Filed: Oct. 26, 2016

(86) PCT No.: PCT/JP2016/081785
§ 371 (c)(1),
(2) Date: Apr. 26, 2018

(87) PCT Pub. No.: WO2017/073634
PCT Pub. Date: May 4, 2017

(65) Prior Publication Data
US 2018/0319325 A1    Nov. 8, 2018

(30) Foreign Application Priority Data

Oct. 27, 2015  (JP) ................................ 2015-211222
Oct. 27, 2015  (JP) ............................. JP2015-211221

(51) Int. Cl.
*B60Q 1/44*  (2006.01)
*B60Q 1/50*  (2006.01)
(Continued)

(52) U.S. Cl.
CPC .......... *B60Q 1/442* (2013.01); *B60Q 1/0035* (2013.01); *B60Q 1/268* (2013.01); *B60Q 1/2696* (2013.01);
(Continued)

(58) Field of Classification Search
None
See application file for complete search history.

(56) References Cited

U.S. PATENT DOCUMENTS 4,631,516 A * 12/1986 Clinker ................. B60Q 1/503
340/464
4,956,866 A * 9/1990 Bernstein ................ B60Q 1/52
340/907

(Continued)

FOREIGN PATENT DOCUMENTS

JP   H05-221263 A    8/1993
JP   H09-277887 A   10/1997
(Continued)

OTHER PUBLICATIONS

International Search Report issued in PCT/JP2016/081785 dated Jan. 24, 2017 (5 pages).

(Continued)

*Primary Examiner* — Curtis J King
(74) *Attorney, Agent, or Firm* — Osha Bergman Watanabe & Burton LLP

(57) ABSTRACT

A vehicle illumination device which is provided in a vehicle capable of travelling in an automatic driving mode includes an illumination unit configured to display stop warning information forewarning stop of the vehicle toward a front of the vehicle, and an illumination controller configured to control the illumination unit such that the stop warning information is displayed toward the front of the vehicle.

6 Claims, 14 Drawing Sheets

(51) Int. Cl.
*B60Q 1/26* (2006.01)
*B60Q 1/00* (2006.01)
*B60Q 1/52* (2006.01)
*G08G 1/16* (2006.01)

(52) U.S. Cl.
CPC .............. *B60Q 1/50* (2013.01); *B60Q 1/503* (2013.01); *B60Q 1/52* (2013.01); *G08G 1/162* (2013.01); *G08G 1/166* (2013.01); *B60Q 2300/45* (2013.01); *B60Q 2300/47* (2013.01); *B60Q 2400/50* (2013.01)

(56) References Cited

U.S. PATENT DOCUMENTS

| | | | | |
|---|---|---|---|---|
| 5,235,329 | A * | 8/1993 | Jackson | G08G 1/0965 340/902 |
| 5,495,242 | A * | 2/1996 | Kick | B60Q 9/008 340/902 |
| 5,889,475 | A * | 3/1999 | Klosinski | G08G 1/087 340/902 |
| 6,087,961 | A * | 7/2000 | Markow | G08G 1/0965 340/902 |
| 6,252,519 | B1 * | 6/2001 | McKenna | G08G 1/0965 340/464 |
| 6,300,870 | B1 * | 10/2001 | Nelson | B60Q 1/503 340/463 |
| 6,553,285 | B1 * | 4/2003 | Bahmad | B60Q 1/503 116/42 |
| 7,095,318 | B1 * | 8/2006 | Bekhor | B60Q 1/26 340/464 |
| 7,449,998 | B1 | 11/2008 | Au et al. | |
| 8,179,240 | B1 * | 5/2012 | Orefice | G08G 1/161 340/435 |
| 8,954,252 | B1 | 2/2015 | Urmson et al. | |
| 9,567,102 | B1 * | 2/2017 | Ross | B64D 45/00 |
| 9,694,736 | B2 * | 7/2017 | Williams | B60Q 1/0094 |
| 9,785,042 | B2 * | 10/2017 | Fujita | B60Q 1/50 |
| 9,802,532 | B2 * | 10/2017 | Kato | B60Q 9/008 |
| 9,868,389 | B2 * | 1/2018 | Williams | B60Q 1/50 |
| 9,878,659 | B2 * | 1/2018 | Williams | B60Q 1/50 |
| 10,053,001 | B1 * | 8/2018 | Nabbe | B60Q 1/50 |
| 10,384,596 | B2 * | 8/2019 | Kato | B60Q 1/34 |
| 2002/0008635 | A1 * | 1/2002 | Ewing | G08G 1/0965 340/902 |
| 2004/0041983 | A1 * | 3/2004 | Bleiner | B60Q 1/52 353/13 |
| 2004/0207519 | A1 * | 10/2004 | Tracy | A61H 3/061 340/467 |
| 2004/0263355 | A1 * | 12/2004 | Carroll | G08G 1/0965 340/907 |
| 2005/0148894 | A1 * | 7/2005 | Misczynski | A61B 5/02405 600/513 |
| 2007/0102214 | A1 * | 5/2007 | Wittorf | B60Q 1/50 180/167 |
| 2007/0139221 | A1 * | 6/2007 | Falvey | G01S 1/68 340/902 |
| 2008/0048858 | A1 * | 2/2008 | Lueth | B60Q 1/50 340/540 |
| 2008/0150755 | A1 * | 6/2008 | Van Zandt | G08G 1/0965 340/902 |
| 2009/0009089 | A1 | 1/2009 | Burkett | |
| 2009/0013922 | A1 * | 1/2009 | Lin | B60Q 1/38 116/28 R |
| 2010/0017111 | A1 * | 1/2010 | Stefani | B60Q 1/50 701/533 |
| 2011/0187559 | A1 * | 8/2011 | Applebaum | B60Q 1/00 340/907 |
| 2012/0044090 | A1 * | 2/2012 | Kahler | B60Q 1/50 340/905 |
| 2012/0089273 | A1 | 4/2012 | Seder et al. | |
| 2014/0028980 | A1 * | 1/2014 | Othmer | B60Q 1/50 353/14 |
| 2014/0062685 | A1 * | 3/2014 | Tamatsu | B60Q 5/005 340/425.5 |
| 2014/0097748 | A1 * | 4/2014 | Kato | B60Q 9/008 315/77 |
| 2015/0091740 | A1 * | 4/2015 | Bai | G08B 21/06 340/901 |
| 2015/0145698 | A1 * | 5/2015 | Werner | H05B 47/19 340/928 |
| 2015/0194053 | A1 * | 7/2015 | Jensen | B60Q 1/442 340/944 |
| 2015/0228195 | A1 | 8/2015 | Beaurepaire et al. | |
| 2015/0258928 | A1 | 9/2015 | Goto et al. | |
| 2016/0167648 | A1 * | 6/2016 | James | B60Q 1/503 701/28 |
| 2017/0028902 | A1 * | 2/2017 | Diaz | B60Q 1/22 |
| 2017/0067609 | A1 | 3/2017 | Ichikawa et al. | |
| 2017/0144591 | A1 * | 5/2017 | Yatsu | F21S 41/125 |
| 2017/0177959 | A1 * | 6/2017 | Boos | G06K 9/00845 |
| 2017/0182934 | A1 * | 6/2017 | Arita | B60Q 1/50 |
| 2017/0203685 | A1 * | 7/2017 | Hirai | B60Q 1/0023 |
| 2017/0217361 | A1 * | 8/2017 | Miller | B60Q 1/22 |
| 2017/0217363 | A1 * | 8/2017 | Kato | B60Q 9/008 |
| 2017/0240096 | A1 * | 8/2017 | Ross | B60Q 1/50 |
| 2017/0240098 | A1 * | 8/2017 | Sweeney | B60Q 1/2611 |
| 2017/0246983 | A1 * | 8/2017 | Canonne | B60Q 1/0076 |
| 2017/0253177 | A1 * | 9/2017 | Kawamata | B60Q 1/50 |
| 2017/0255093 | A1 * | 9/2017 | Fujita | B60Q 1/50 |
| 2017/0267167 | A1 * | 9/2017 | Sakata | B60Q 1/38 |
| 2018/0009373 | A1 * | 1/2018 | Kato | B60Q 9/008 |
| 2018/0072218 | A1 * | 3/2018 | Sweeney | B60Q 1/2611 |
| 2018/0086254 | A1 * | 3/2018 | Morel | B60Q 1/0076 |
| 2018/0086262 | A1 * | 3/2018 | Morel | G08G 1/162 |
| 2018/0090011 | A1 * | 3/2018 | Morel | G08G 1/167 |
| 2018/0093607 | A1 * | 4/2018 | Omanovic | B60Q 1/34 |
| 2018/0126897 | A1 * | 5/2018 | Hamada | B60Q 1/00 |
| 2018/0229643 | A1 * | 8/2018 | Frimpong | B60Q 1/00 |
| 2018/0238512 | A1 * | 8/2018 | Courcier | B60Q 1/085 |
| 2018/0251064 | A1 * | 9/2018 | Albou | G06F 3/011 |
| 2018/0257547 | A1 * | 9/2018 | Suzuki | B60Q 1/50 |
| 2018/0257548 | A1 * | 9/2018 | Suzuki | B60Q 1/50 |
| 2018/0260182 | A1 * | 9/2018 | Suzuki | G06F 3/1423 |
| 2018/0261081 | A1 * | 9/2018 | Suzuki | B60Q 9/008 |
| 2020/0010012 | A1 | 1/2020 | Ichikawa et al. | |

FOREIGN PATENT DOCUMENTS

| | | |
|---|---|---|
| JP | 2004-009829 A | 1/2004 |
| JP | 2012-056438 A | 3/2012 |
| JP | 2013-159117 A | 8/2013 |
| JP | 2014-184876 A | 10/2014 |
| JP | 2015-143093 A | 8/2015 |
| JP | 2015-174541 A | 10/2015 |
| WO | 2006/036920 A2 | 4/2006 |
| WO | 2015/133302 A1 | 9/2015 |
| WO | 2017/138146 A1 | 8/2017 |

OTHER PUBLICATIONS

Written Opinion issued in PCT/JP2016/081785 dated Jan. 24, 2017 (6 pages).
Extended European Search Report in counterpart European Application No. 16859863.9 dated May 20, 2019 (10 pages).
Office Action in counterpart European Application No. 16859863.9 dated Jan. 21, 2020 (9 pages).
Office Action issued in Japanese Application No. 2017-547840, dated Sep. 8, 2020 (12 pages).

* cited by examiner

VEHICULAR ILLUMINATION DEVICE, VEHICLE SYSTEM, AND VEHICLE

CROSS-REFERENCE TO RELATED APPLICATIONS

The present application claims priority to Japanese Patent Application No. 2015-211221 filed on Oct. 27, 2015, and Japanese Patent Application No. 2015-211222 filed on Oct. 27, 2015, the contents of which are incorporated herein by reference in their entirety.

BACKGROUND

Technical Field

The present disclosure relates to a vehicle illumination device. In particular, the present disclosure relates to a vehicle illumination device provided in a vehicle capable of travelling in an automatic driving mode. Further, the present disclosure relates to a vehicle system including the vehicle illumination device, and a vehicle including the vehicle system.

Related Art

Currently, research on the automatic driving technique of automobiles has been actively conducted in each country, and each country is examining laws so as to enable a vehicle (hereinafter, a "vehicle" refer to an automobile) to travel in an automatic driving mode on public roads. Here, in the automatic driving mode, a vehicle system automatically controls the travelling of a vehicle. Specifically, in the automatic driving mode, the vehicle system performs at least one of a steering control (control of the vehicle in the travelling direction), a brake control and an accelerator control (control of the braking and acceleration/deceleration of the vehicle) based on various information obtained from a camera, a sensor, and a radar or the like. On the other hand, in a manual driving mode described below, a driver controls the travelling of a vehicle, as in most of conventional vehicles. Specifically, in the manual driving mode, the travelling of the vehicle is controlled according to an operation (steering operation, braking operation, accelerator operation) of a driver, and the vehicle system does not automatically perform the steering control, the brake control and the accelerator control. Meanwhile, the driving mode of the vehicle is not a concept existing only in some vehicles but a concept existing in all vehicles including conventional type vehicles having no automatic driving function. For example, the driving mode of the vehicle is classified according to a vehicle control method or the like.

Thus, in the future, it is expected that vehicles (hereinafter, suitably referred to as "automatic driving vehicle") travelling in the automatic driving mode and vehicles (hereinafter, suitably referred to as "manual driving vehicle") travelling in the manual driving mode coexist on public roads. In particular, under the situation where many automatic driving vehicles travel on public roads, it is preferable that a pedestrian or the like in front of an automatic driving vehicle can grasp in advance that the automatic driving vehicle is stopped. Furthermore, it is preferable that the automatic driving vehicle is capable of presenting that it is recognizing a pedestrian or an emergency vehicle or the like (hereinafter, a pedestrian or the like).

For example, when a pedestrian trying to cross a crosswalk is present in front of a manual driving vehicle, the pedestrian can judge whether the vehicle is stopped before the crosswalk by confirming the state and sign of the driver of the manual driving vehicle. On the other hand, in the case of the automatic driving vehicle (in particular, automatic driving vehicle that is travelling in the fully automatic driving mode without occupant), it is difficult for a pedestrian trying to cross a crosswalk to judge in advance whether the vehicle is stopped before the crosswalk.

Further, in the case where a pedestrian trying to cross a crosswalk is present in front of an automatic driving vehicle, the pedestrian feels uneasy whether he can cross the crosswalk if he does not know that the automatic driving vehicle is recognizing him. Furthermore, a driver of an emergency vehicle (an ambulance, a fire truck, a patrol car, etc.) travelling behind an automatic driving vehicle feels uneasy whether to overtake the automatic driving vehicle if he does not know that the automatic driving vehicle is recognizing the emergency vehicle.

Patent Document 1 discloses an automatic follow-up travelling system in which a following vehicle travels so as to automatically follow a preceding vehicle. In the automatic follow-up travelling system, each of the preceding vehicle and the following vehicle has an illumination device, character information for preventing interruption of other vehicle between the preceding vehicle and the following vehicle is displayed on the illumination device of the preceding vehicle, and character information indicating the automatic follow-up travelling mode is displayed on the illumination device of the following vehicle.

Patent Document

Patent Document 1: JP-A-H9-277887

SUMMARY OF THE INVENTION

However, Patent Document 1 does not discuss a vehicle illumination device or a vehicle system capable of displaying information forewarning the stop of an automatic driving vehicle toward the front of the vehicle.

Further, Patent Document 1 does not discuss a vehicle illumination device or a vehicle system capable of presenting, to an object, the fact that an automatic driving vehicle is recognizing the object.

Accordingly, one or more embodiments of the present disclosure provides a vehicle illumination device which can display, toward a front of the own vehicle, stop warning information forewarning stop of the own vehicle travelling in the automatic driving mode.

Further, one or more embodiments of the present disclosure is to provides a vehicle illumination device which can present, to an object, a fact that the vehicle capable of travelling in the automatic driving mode is recognizing the object.

A vehicle illumination device according to a first aspect of the present disclosure is provided in a vehicle capable of travelling in an automatic driving mode and includes an illumination unit configured to display stop warning information forewarning stop of the vehicle toward a front of the vehicle, and an illumination control unit configured to control the illumination unit such that the stop warning information is displayed toward the front of the vehicle.

According to the above configuration, it is possible to provide the vehicle illumination device capable of displaying the stop warning information forewarning the stop of the own vehicle travelling in the automatic driving mode toward the front of the own vehicle. In this manner, since a pedestrian existing in front of the own vehicle can grasp in advance that the own vehicle is stopped by looking at the stop warning information, the pedestrian can safely cross a crosswalk or the like.

The illumination unit may be configured to display the stop warning information on a road surface in front of the vehicle.

According to the above configuration, a pedestrian existing in front of the own vehicle can grasp in advance that the own vehicle is stopped by looking at the stop warning information displayed on the road surface in front of the own vehicle.

The illumination unit may be configured to display the stop warning information on a front window of the vehicle.

According to the above configuration, a pedestrian existing in front of the own vehicle can grasp in advance that the own vehicle is stopped by looking at the stop warning information displayed on the front window of the vehicle.

The illumination unit may be configured to irradiate light toward the front of the vehicle, and the illumination control unit may be configured to set an illumination state of the illumination unit to a predetermined illumination state.

According to the above configuration, a pedestrian existing in front of the own vehicle can grasp in advance that the own vehicle is stopped by looking at the illumination state of the illumination unit.

Further, there is provided a vehicle system including the above vehicle illumination device and a vehicle control unit configured to control travelling of the vehicle. The vehicle control unit generates an instruction signal for instructing to display the stop warning information when it is determined that the vehicle should be stopped. The vehicle illumination device displays the stop warning information toward the front of the vehicle based on the instruction signal.

According to the above configuration, it is possible to provide the vehicle system capable of displaying the stop warning information forewarning the stop of the own vehicle travelling in the automatic driving mode toward the front of the own vehicle.

Further, there may be provided a vehicle including the above vehicle system.

According to the above configuration, it is possible to provide the vehicle capable of displaying the stop warning information forewarning the stop of the own vehicle travelling in the automatic driving mode toward the front of the own vehicle.

A vehicle illumination device according to a second aspect of the present disclosure is provided in a vehicle capable of travelling in an automatic driving mode and includes a first illumination unit configured to irradiate light toward an outside of the vehicle, and an illumination control unit configured to control the first illumination unit to irradiate the light to an object based on position information of the object.

According to the above configuration, it is possible to provide the vehicle illumination device capable of presenting, to an object such as a pedestrian, a fact that the vehicle capable of travelling in the automatic driving mode is recognizing the object. In this manner, since an object such a pedestrian or an emergency vehicle can grasp that the vehicle is recognizing the object by looking at the light irradiated from the first illumination unit, the object can be relieved.

The first illumination unit may be configured to irradiate a light pattern which has a ring shape or a linear shape toward the outside of the vehicle. The illumination control unit may be configured to control the first illumination unit to irradiate the light pattern toward the object based on the position information of the object.

According to the above configuration, since an object such a pedestrian or an emergency vehicle can grasp that the vehicle is recognizing the object by looking at the light pattern which has a ring shape or a linear shape irradiated from the first illumination unit, the object can be relieved.

The object may be a pedestrian or an emergency vehicle.

According to the above configuration, since a pedestrian trying to cross a crosswalk or the like can grasp that the vehicle is recognizing the pedestrian by looking at the light irradiated from the first illumination unit, the pedestrian can safely cross the crosswalk or the like. Further, since an emergency vehicle trying to overtake the vehicle can grasp that the vehicle is recognizing the emergency vehicle by looking at the light irradiated from the first illumination unit, the emergency vehicle can safely overtake the vehicle.

Further, there may be provided a vehicle system including a detection unit configured to detect an object, a position information acquisition unit configured to acquire position information of the object, and the above vehicle illumination device. The vehicle illumination device may be configured to irradiate light toward the object based on the position information.

According to the above configuration, it is possible to provide the vehicle system capable of presenting, to an object such as a pedestrian, the fact that a vehicle capable of travelling in the automatic driving mode is recognizing the object.

Further, there may be provided a vehicle including the vehicle system.

According to the above configuration, it is possible to provide the vehicle capable of travelling in the automatic driving mode and presenting, to an object, the fact that the vehicle is recognizing the object.

Further, there may be provided a system for vehicle including the above vehicle system and a mobile terminal. In the system of vehicle, the object is a pedestrian carrying the mobile terminal, and the vehicle system further includes a first wireless communication unit configured to transmit or receive an illumination control signal. The vehicle illumination device further includes a second illumination unit configured to irradiate light toward the outside of the vehicle.

The mobile terminal includes:
  a second wireless communication unit configured to transmit or receive the illumination control signal;
  a display unit configured to irradiate light; and
  a control unit configured to control an illumination state of the display unit.

(A) When the first wireless communication unit receives the illumination control signal from the second wireless communication unit, the illumination control unit controls the second illumination unit such that the illumination state of the second illumination unit corresponds to the illumination state of the display unit, based on the received illumination control signal, or (B) When the second wireless communication unit receives the illumination control signal from the first wireless communication unit, the control unit controls the display unit such that the illumination state of the display unit corresponds to the illumination state of the second illumination unit, based on the received illumination control signal.

According to the above configuration, since a pedestrian carrying the mobile terminal can grasp that the vehicle is recognizing the pedestrian by looking at not only the light irradiated from the first illumination unit but also the illumination state of the second illumination unit and the illumination state of the display unit of the mobile terminal, the pedestrian can safely cross a crosswalk or the like. In particular, since the illumination state of the second illumination unit corresponds to the illumination state of the display unit of the mobile terminal, the pedestrian can grasp that the vehicle is recognizing the pedestrian.

Further, there may be provided a system for vehicle including the above vehicle system and an emergency vehicle.

In the system for vehicle, the object is the emergency vehicle, and the vehicle system further includes a first wireless communication unit configured to transmit or receive an illumination control signal. The vehicle illumination device further includes a second illumination unit configured to irradiate light toward the outside of the vehicle.

The emergency vehicle includes:
a second wireless communication unit configured to transmit or receive the illumination control signal;
a display unit configured to irradiate light; and
a control unit configured to control an illumination state of the display unit.
(A) When the first wireless communication unit receives the illumination control signal from the second wireless communication unit, the illumination control unit controls the second illumination unit such that the illumination state of the second illumination unit corresponds to the illumination state of the display unit, based on the received illumination control signal, or
(B) When the second wireless communication unit receives the illumination control signal from the first wireless communication unit, the control unit controls the display unit such that the illumination state of the display unit corresponds to the illumination state of the second illumination unit, based on the received illumination control signal.

According to the above configuration, since a driver of the emergency vehicle can grasp that the vehicle is recognizing the emergency vehicle by looking at not only the light irradiated from the first illumination unit but also the illumination state of the second illumination unit and the illumination state of the display unit of the emergency vehicle, the driver of the emergency vehicle can safely overtake the vehicle. In particular, since the illumination state of the second illumination unit corresponds to the illumination state of the display unit of the emergency vehicle, the driver of the emergency vehicle can grasp that the vehicle is recognizing the emergency vehicle.

According the first aspect of the present disclosure, it is possible to provide the vehicle illumination device capable of displaying, toward the front of the own vehicle, the stop warning information forewarning the stop of the own vehicle travelling in the automatic driving mode.

Further, according to the second aspect of the present disclosure, it is possible to provide the vehicle illumination device which can present, to an object, the fact that the vehicle capable of travelling in the automatic driving mode is recognizing the object.

DETAILED DESCRIPTION

First Embodiment

Figure 1:
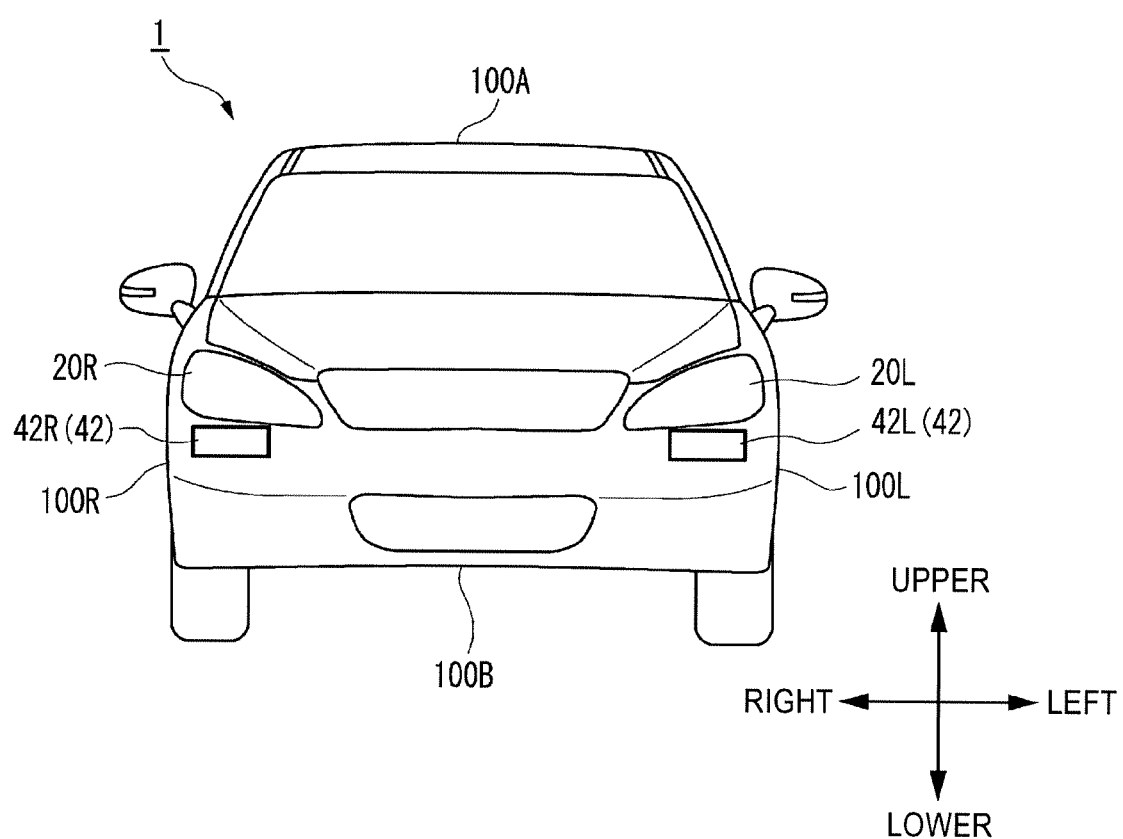
FIG. 1 is a front view of a vehicle on which a vehicle illumination device according to a first embodiment of the present disclosure (hereinafter, simply referred to as a "first embodiment") is mounted.

Hereinafter, a first embodiment will be described with reference to the drawings. Incidentally, for the sake of convenience of explanation, the explanation of members having the same reference numerals as those already described in the description of the present embodiment will be omitted. Further, for the sake of convenience of explanation, dimensions of each member shown in the drawings may be different from actual dimensions of each member.

Further, for the sake of convenience of explanation, "a left-right direction," "a front-rear direction," and "an upper-lower direction" are appropriately mentioned in the description of the present embodiment. These directions refer to the relative directions set for a vehicle 1 shown in FIG. 1. Here, "the upper-lower direction" refers to a direction including "an upper direction" and "a lower direction." "The front-rear direction" refers to a direction including "a front direction" and "a rear direction." "The left-right direction" refers to a direction including "a left direction" and "a right direction."

A vehicle illumination device 4 (hereinafter, simply referred to as the "illumination device 4") according to a first embodiment will be described below. FIG. 1 shows a front view of the vehicle 1 on which the illumination device 4 (see FIG. 2) according to the first embodiment is mounted. The vehicle 1 is an automobile capable of travelling in an automatic driving mode and includes the illumination device 4. The illumination device 4 includes an illumination unit 42 and an illumination control unit 43 (see FIG. 2). The illumination unit 42 is configured to display stop warning information forewarning the stop of the vehicle 1 toward the front of the vehicle 1 and has a left illumination unit 42L and a right illumination unit 42R. The left illumination unit 42L is disposed in the vicinity of a left headlamp 20L, and the right illumination unit 42R is disposed in the vicinity of a right headlamp 20R. Each of the left illumination unit 42L and the right illumination unit 42R is, for example, a laser scanning device that includes a laser light source and an optical deflection device for deflecting laser light emitted from the laser light source. The optical deflection device is, for example, a movable mirror such as an MEMS (Micro Electro Mechanical Systems) mirror or a galvanometer mirror. As will be described later, the illumination unit 42 scans laser light to draw stop warning information (e.g., a stop line M1 shown in FIG. 4 or a crosswalk M2 shown in FIG. 5) on a road surface in front of the vehicle 1.

Meanwhile, in the first embodiment, the left illumination unit 42L and the right illumination unit 42R are disposed in the vicinity of the left headlamp 20L and the right headlamp 20R, respectively. However, the number and arrangement of the illumination unit 42 are not particularly limited, so long as the illumination unit 42 (the left illumination unit 42L and the right illumination unit 42R) are configured to be able to display the stop warning information toward the front of the vehicle 1. For example, the left illumination unit 42L may be disposed in the left headlamp 20L, and the right illumination unit 42R may be disposed in the right headlamp 20R. Further, the left illumination unit 42L may be disposed on a left surface 100L, and the right illumination unit 42R may be disposed on a right surface 100R. Further, the single illumination unit 42 may be disposed on a vehicle body roof 100A of the vehicle 1 or on a rear surface 100B facing a road surface.

Figure 2:
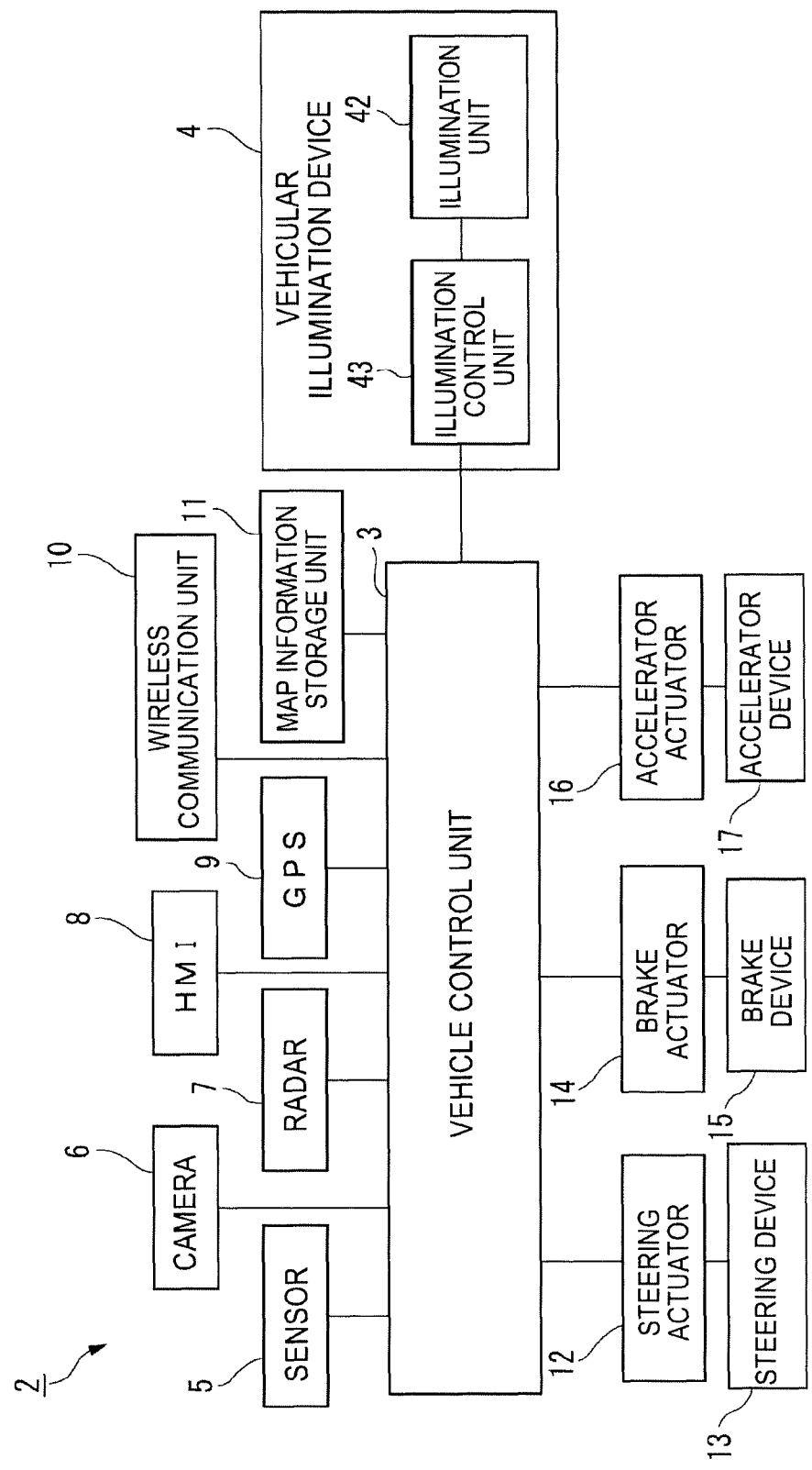
FIG. 2 is a block diagram of a vehicle system including the vehicle illumination device according to the first embodiment.

Next, a vehicle system 2 of the vehicle 1 will be described with reference to FIG. 2. FIG. 2 shows a block diagram of the vehicle system 2. As shown in FIG. 2, the vehicle system 2 includes a vehicle control unit 3, the illumination device 4, a sensor 5, a camera 6, a radar 7, a HMI (Human Machine Interface) 8, a GPS (Global Positioning System) 9, a wireless communication unit 10, and a map information storage unit 11. The vehicle system 2 further includes a steering actuator 12, a steering device 13, a brake actuator 14, a brake device 15, an accelerator actuator 16, and an accelerator device 17.

The vehicle control unit 3 is configured to control the travelling of the vehicle 1. The vehicle control unit 3 is configured by, for example, an electronic control unit (ECU: Electronic Control Unit). The electronic control unit includes a microcontroller having a processor and a memory, and other electronic circuits (e.g., transistors, etc.). The processor is, for example, a CPU (Central Processing Unit), an MPU (Micro Processing Unit) and/or a GPU (Graphics Processing Unit). The memory includes a ROM (Read Only Memory) in which various vehicle control programs (e.g., an artificial intelligence (AI) program for automatic driving, etc.) are stored, and a RAM (Random Access Memory) in which various vehicle control data are temporarily stored. The processor is configured to develop, on the RAM, a program designated from the various vehicle control programs stored in the ROM and execute various processes in cooperation with the RAM.

The illumination device 4 is configured to display the stop warning information toward the front of the vehicle 1, and includes the illumination unit 42 and the illumination control unit 43. The illumination control unit 43 is configured by an electronic control unit (ECU) and controls the illumination unit 42 so that the stop warning information is displayed toward the front of the vehicle 1.

For example, when it is determined that the vehicle 1 should be stopped, the vehicle control unit 3 generates an instruction signal for instructing to display the stop warning information and transmits the instruction signal to the illumination control unit 43. The illumination control unit 43 displays the stop warning information in front of the vehicle 1 by driving and controlling the illumination unit 42 based on the received instruction signal. That is, the illumination device 4 displays the stop warning information in front of the vehicle 1 based on the instruction signal.

The illumination control unit 43 is configured by an electronic control unit (ECU). The illumination control unit 43 is configured to set an illumination state (turn on/off, illumination color, luminous intensity, light emitting area or blinking cycle, etc.) of the illumination unit 42 to a predetermined illumination state in accordance with information relating to the automatic driving of the vehicle 1. Further, the electronic control unit is electrically connected to a power supply (not shown) and includes a microcontroller having a processor such as a CPU or an MPU and a memory such as a ROM and a RAM, and other electronic circuits (e.g., a drive circuit such as an LED driver). In the first embodiment, the vehicle control unit 3 and the illumination control unit 43 are provided as a separate component. However, the vehicle control unit 3 and the illumination control unit 43 may be integrally configured. That is, the illumination control unit 43 and the vehicle control unit 3 may be configured by a single electronic control unit.

The sensor 5 includes an acceleration sensor, a speed sensor, a gyro sensor, and the like. The sensor 5 is configured to detect a travelling condition of the vehicle 1 and output the travelling condition information to the vehicle control unit 3. The sensor 5 may further include a seating sensor configured to detect whether a driver is sitting on a driver's seat, a face orientation sensor configured to detect a direction of a driver's face, an external weather sensor configured to detect external weather condition, a human sensor configured to detect whether a person is inside a vehicle, and the like. Furthermore, the sensor 5 may include an illuminance sensor configured to detect illuminance of the surrounding environment of the vehicle 1.

The camera 6 is, for example, a camera including an imaging device such as a CCD (Charge-Coupled Device) and CMOS (complementary MOS). The radar 7 is a millimeter wave radar, a microwave radar, a laser radar, or the like. The camera 6 and the radar 7 are configured to detect the surrounding environment (other vehicles, pedestrians, road shapes, traffic signs, obstacles, etc.) of the vehicle 1 and output the surrounding environment information to the vehicle control unit 3.

The HMI 8 includes an input unit configured to receive an input operation from a driver and an output unit configured to output the travelling information and the like to the driver. The input unit includes a steering wheel, an accelerator pedal, a brake pedal, a driving mode changeover switch for switching the driving mode of the vehicle 1, and the like. The output unit is a display for displaying various travelling information.

The GPS 9 is configured to acquire current position information of the vehicle 1 and output the acquired current position information to the vehicle control unit 3. The wireless communication unit 10 is configured to receive information (e.g., travelling information) relating to other vehicle around the vehicle 1 from other vehicle and transmit information (e.g., travelling information) relating to the vehicle 1 to other vehicle (inter-vehicle communication). Further, the wireless communication unit 10 is configured to receive infrastructure information from infrastructure equipment such as traffic lights and sign lamps and transmit the travelling information of the vehicle 1 to the infrastructure equipment (road-to-vehicle communication). The map information storage unit 11 is an external storage device such as a hard disk drive in which map information is stored. The map information storage unit 11 is configured to output the map information to the vehicle control unit 3.

When the vehicle 1 travels in an automatic driving mode, the vehicle control unit 3 automatically generates at least one of a steering control signal, an accelerator control signal and a brake control signal based on the travelling condition information, the surrounding environment information, the current position information, the map information, and the like. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. Thus, in the automatic driving mode, the travelling of the vehicle 1 is automatically controlled by the vehicle system 2.

On the other hand, when the vehicle 1 travels in a manual driving mode, the vehicle control unit 3 generates a steering control signal, an accelerator control signal and a brake control signal in accordance with a manual operation of a driver on the brake pedal and the steering wheel. Thus, in the manual driving mode, the steering control signal, the accelerator control signal and the brake control signal are generated by the manual operation of the driver, so that the travelling of the vehicle 1 is controlled by the driver.

Next, a driving mode of the vehicle 1 will be described. The driving mode includes an automatic driving mode and a manual driving mode. The automatic driving mode includes a fully automatic driving mode, an advanced driving support mode, and a driving support mode. In the fully automatic driving mode, the vehicle system 2 automatically performs all of the travelling controls of the steering control, the brake control and the accelerator control, and the driver is not in a state where it is possible to drive the vehicle 1. In the advanced driving support mode, the vehicle system 2 automatically performs all of the travelling controls of the steering control, the brake control and the accelerator control, and the driver does not drive the vehicle 1 although the driver is in a state where it is possible to drive the vehicle 1. In the driving support mode, the vehicle system 2 automatically performs a part of the travelling controls of the steering control, the brake control and the accelerator control, and the driver drives the vehicle 1 under the driving support of the vehicle system 2. On the other hand, in the manual driving mode, the vehicle system 2 does not automatically perform the travelling controls, and the driver drives the vehicle 1 without the driving support of the vehicle system 2.

Further, the driving mode of the vehicle 1 may be switched by operating a driving mode changeover switch. In this case, the vehicle control unit 3 switches the driving mode of the vehicle 1 among four driving modes (the fully automatic driving mode, the advanced driving support mode, the driving support mode, and the manual driving mode) in accordance with the operation of the driver on the driving mode changeover switch. Further, the driving mode of the vehicle 1 may be automatically switched based on the information relating to a travel-allowed section where the travelling of an automatic driving vehicle is allowed or a travel-prohibited section where the travelling of the automatic driving vehicle is prohibited or the information relating to the external weather condition. In this case, the vehicle control unit 3 switches the driving mode of the vehicle 1 based on such information. Furthermore, the driving mode of the vehicle 1 may be automatically switched by using a seating sensor, a face orientation sensor, or the like. In this case, the vehicle control unit 3 switches the driving mode of the vehicle 1 based on the output signal from the seating sensor or the face orientation sensor.

Figure 3:
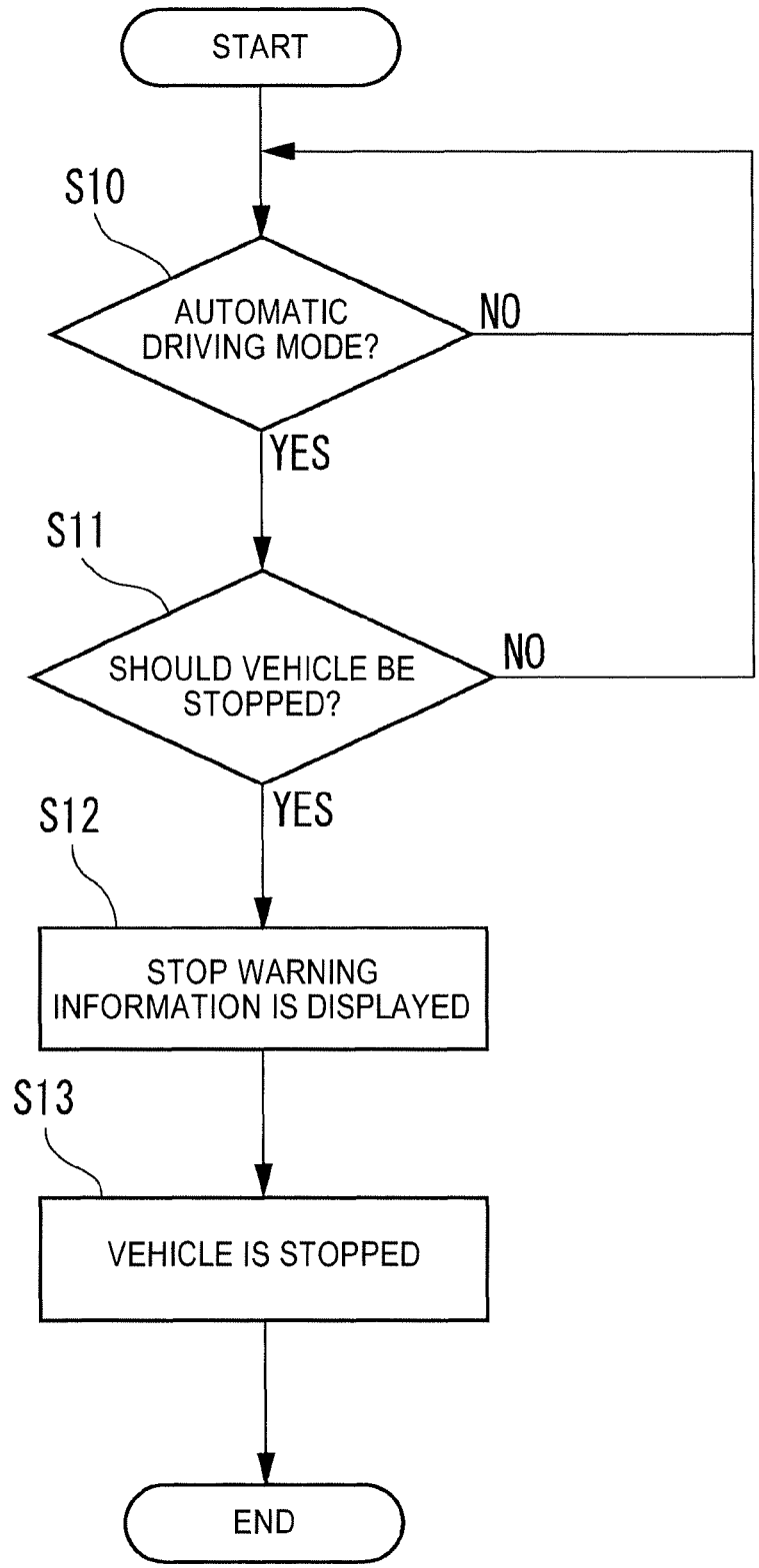
FIG. 3 is a flowchart showing a process for displaying stop warning information.

Next, a process for displaying the stop warning information will be described with reference to FIG. 3.

First, the vehicle control unit 3 determines whether the driving mode of the vehicle 1 is the automatic driving mode (Step S10). When it is determined that the driving mode of the vehicle 1 is the automatic driving mode (YES in Step S10), the vehicle control unit 3 determines whether to stop the vehicle 1 (Step S11). On the other hand, when it is determined that the driving mode of the vehicle 1 is not the automatic driving mode (that is, when it is determined that the driving mode of the vehicle 1 is the manual driving mode) (NO in Step S10), the vehicle control unit 3 waits until the driving mode of the vehicle 1 becomes the automatic driving mode.

The vehicle control unit 3 may determine whether to stop the vehicle 1 based on the surrounding environment information obtained from the camera 6 or the radar 7. For example, when it is determined from the surrounding environment information that a front obstacle such as a broken car or a stop sign exists in front of the vehicle 1, the vehicle control unit 3 may determine that the vehicle 1 should be stopped. Further, when it is determined from the surrounding environment information that the color of a traffic light in front of the vehicle 1 is red, the vehicle control unit 3 may determine that the vehicle 1 should be stopped. Further, when it is determined from the surrounding environment information that a pedestrian exists in the vicinity of a crosswalk, the vehicle control unit 3 may determine that the vehicle 1 should be stopped. Meanwhile, it is conceivable that the detection rate of a pedestrian is decreased at night or in bad weather or a pedestrian who has not been detected suddenly appears in the vicinity of a crosswalk. Therefore, when it is determined that a crosswalk is present in front of the vehicle 1, the vehicle control unit 3 may determine that the vehicle 1 should be stopped, irrespective of the present or absence of a pedestrian.

When it is determined that the vehicle 1 should be stopped (YES in Step S11), the vehicle control unit 3 generates an instruction signal for instructing to display the stop warning information and transmits the instruction signal to the illumination control unit 43. Then, the illumination control unit 43 drives and controls the illumination unit 42 based on the received instruction signal. As a result, the stop warning information formed by laser scanning is displayed on a road surface in front of the vehicle 1 (Step S12). Then, the vehicle control unit 3 transmits a brake control signal to the brake actuator 14. The brake actuator 14 stops the vehicle 1 by controlling the brake device 15 based on the received brake control signal (Step S13). On the other hand, when the vehicle control unit 3 determines that the vehicle 1 should not be stopped (NO in Step S11), the process returns to Step S10. In this manner, a series of process is ended. This process may be repeatedly executed at a predetermined cycle.

Meanwhile, in Step S10, the vehicle control unit 3 determines whether the driving mode of the vehicle 1 is the automatic driving mode. However, instead of this, the vehicle control unit 3 may determine whether the driving mode of the vehicle 1 is the automatic driving mode excluding the driving support mode. That is, since a pedestrian existing in front of the vehicle 1 cannot confirm the state and sign of a driver in the case where the vehicle 1 is travelling in the fully automatic driving mode or the advanced driving support mode, it is difficult to judge whether the vehicle 1 is stopped. Therefore, when the driving mode is the fully automatic driving mode or the advanced driving support mode, the stop warning information is especially beneficial for pedestrians.

Further, in Step S12, when the vehicle control unit 3 determines that the vehicle 1 should be stopped, the stop warning information is displayed on a road surface in front of the vehicle 1. On the other hand, even when the vehicle control unit 3 determines that the vehicle 1 should be stopped, the stop warning information may not be displayed depending on a situation (in other words, the vehicle control unit 3 may not generate the instruction signal). For example, in a situation where the vehicle 1 is stopped at a travelling section for which entry of a pedestrian is prohibited or in a situation where the vehicle 1 is stopped at a crosswalk where a pedestrian does not exist obviously in the vicinity, the stop warning information may not be displayed.

Figure 4:
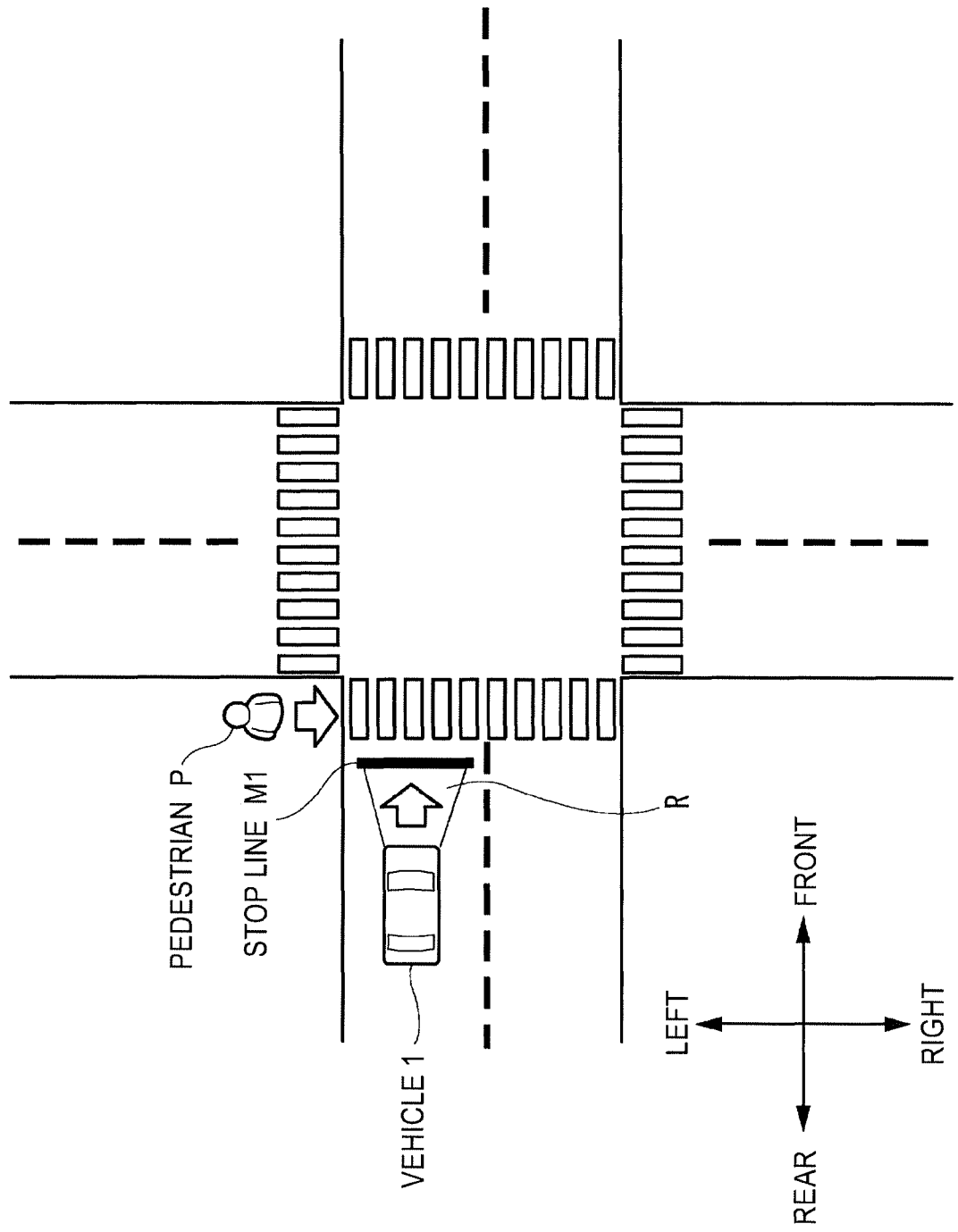
FIG. 4 is a view showing an example of the stop warning information displayed on a road surface in front of a vehicle.
Figure 5:
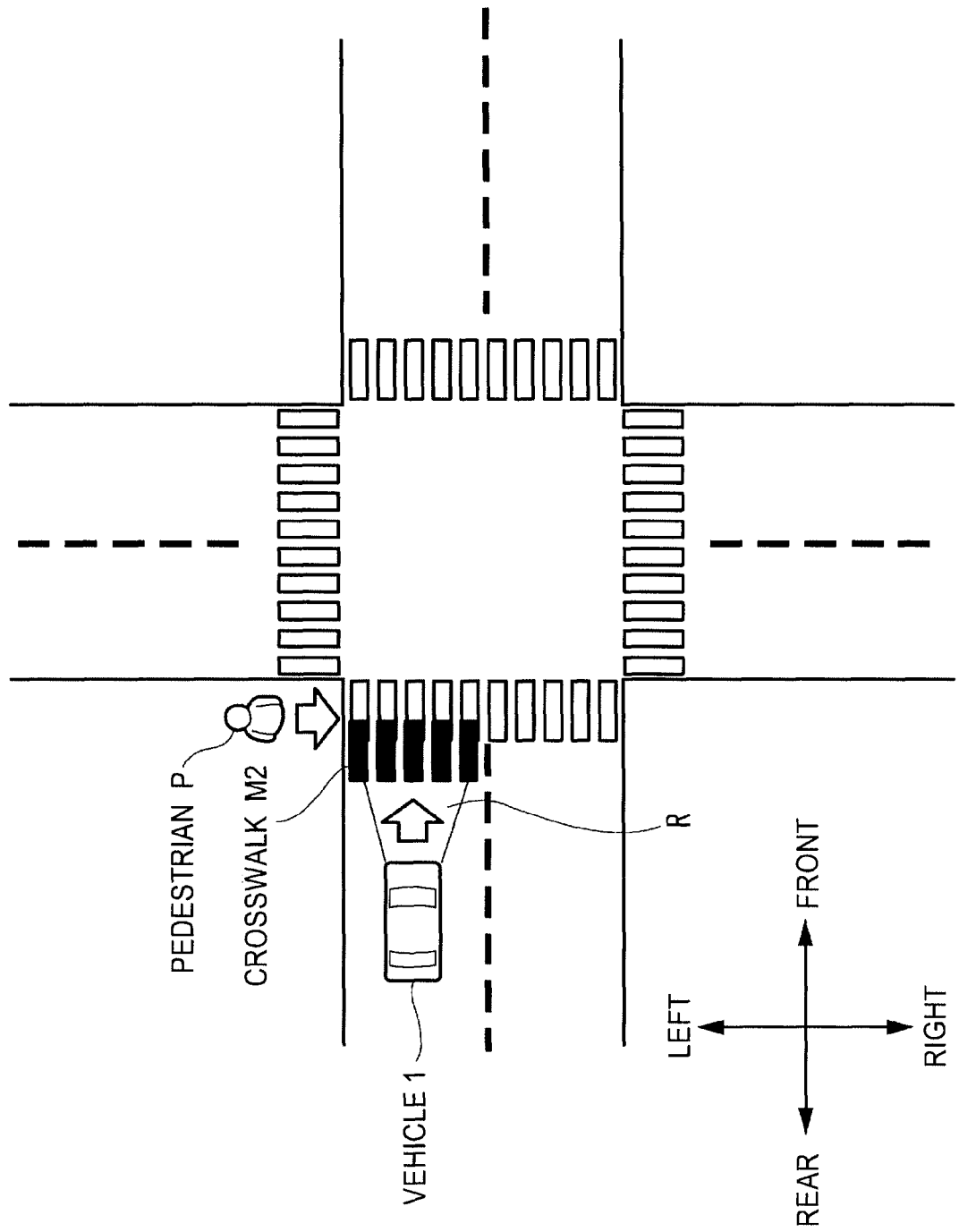
FIG. 5 is a view showing another example of the stop warning information displayed on the road surface in front of the vehicle.

Next, an example of the stop warning information displayed on a road surface R in front of the vehicle 1 will be described with reference to FIGS. 4 and 5. FIG. 4 shows the stop line M1 as an example of the stop warning information displayed on the road surface R in front of the vehicle 1. FIG. 5 shows the crosswalk M2 as another example of the stop warning information displayed on the road surface R in front of the vehicle 1. As described above, the illumination unit 42 (the left illumination unit 42L and the right illumination unit 42R) is configured by a laser light source for emitting laser light and an optical deflection device for deflecting the laser light. Therefore, when the illumination control unit 43 drives and controls the illumination unit 42 based on the instruction signal, the optical deflection device deflects the laser light and scans the laser light on the road surface R in front of the vehicle 1. In this way, the stop line M1 or the crosswalk M2 is displayed on the road surface R in front of the vehicle 1 by the scanning of the laser light. Meanwhile, it is preferable that the color of the laser light is green.

According to the first embodiment, it is possible to provide the illumination device 4 capable of displaying, toward the front of the vehicle 1, the stop warning information forewarning the stop of the vehicle 1 travelling in the automatic driving mode. In this manner, a pedestrian P existing in front of the vehicle 1 can grasp in advance that the vehicle 1 is stopped by looking at the stop warning information (the stop line M1 or the crosswalk M2) displayed on the road surface R, so that the pedestrian P can safely cross the crosswalk or the like. Furthermore, an occupant of the vehicle 1 (in particular, an occupant sitting on a driver's seat) can grasp in advance that the vehicle 1 is stopped by looking at the stop warning information, so that the occupant becomes less susceptible to a surprise hit by the stop of the vehicle 1. Meanwhile, in the first embodiment, the stop line M1 and the crosswalk M2 are exemplified as an example of the stop warning information. However, other figures or character information may be displayed on the road surface R.

<First Modification of Illumination Unit>

Next, a first modification of the illumination unit will be described below.

In the embodiment described above, the illumination unit 42 (the left illumination unit 42L and the right illumination unit 42R) is configured to display the stop warning information (the stop line M1 and the crosswalk M2) formed by the scanning of the laser light on the road surface R.

On the other hand, in the present modification, the illumination unit 42 (the left illumination unit 42L and the right illumination unit 42R) is configured to irradiate light toward the front of the vehicle 1, and the illumination control unit 43 is configured to set the illumination state (the turn on/off, the illumination color, the light emitting area, the blinking cycle and the luminous intensity, etc.) of the illumination unit 42 to a predetermined illumination state. The illumination unit 42 includes one or more light emitting elements such as an LED (Light Emitting Diode) or laser. The illumination control unit 43 sets the illumination state of the illumination unit 42 to a predetermined illumination state based on the instruction signal received from the vehicle control unit 3. Specifically, the illumination control unit 43 may be configured to turn on or turn off the illumination unit 42 based on the instruction signal. For example, when the illumination unit 42 is turned off in the initial state, the illumination control unit 43 may turn on the illumination unit 42 based on the instruction signal. On the contrary, when the illumination unit 42 is turned on in the initial state, the illumination control unit 43 may turn off the illumination unit 42 based on the instruction signal. Alternatively, the illumination control unit 43 may set the illumination color of the illumination unit 42 to a predetermined illumination color (e.g., white, green, blue, etc.) based on the instruction signal. Further, the illumination control unit 43 may set the light emitting area of the illumination unit 42 to a predetermined light emitting area (e.g., the half of the volume of the illumination unit 42 may be set as the light emitting area) based on the instruction signal. Furthermore, the illumination control unit 43 may set the blinking cycle of the illumination unit 42 to a predetermined blinking cycle T based on the instruction signal. For example, when the illumination unit 42 is not blinking in the initial state, the illumination control unit 43 may cause the illumination unit 42 to blink based on the instruction signal. Furthermore, the illumination control unit 43 may set the luminous intensity of the illumination unit 42 to a predetermined luminous intensity I. As a result, the change in the illumination state of the illumination unit 42 of the illumination unit 42 is displayed toward the front of the vehicle 1.

In this manner, according to the present modification, since the change in the illumination state of the illumination unit 42 is displayed as the stop warning information toward the front of the vehicle 1, the pedestrian P existing in front of the vehicle 1 can grasp in advance that the vehicle 1 is stopped by looking at the illumination state of the illumination unit 42.

In the first embodiment, as an example of the change in the illumination state of the illumination unit 42, the changes in the turn on/off, the light emitting area, the illumination color, the blinking cycle and the luminous intensity of the illumination unit 42 have been described, respectively. However, the change in the illumination state is not limited to these. Various changes in the illumination state can be applied, so long as the illumination state of the illumination unit 42 can be changed in accordance with the driving mode of the vehicle 1. For example, the illumination state of the illumination unit 42 may be changed by combining the turn on/off, the light emitting area, the illumination color, the blinking cycle and the luminous intensity of the illumination unit 42.

Further, the illumination control unit 43 may predict the lifetime of the illumination unit 42 based on a current value and a voltage value of a lighting control circuit constituting the illumination control unit 43 and the temperature and humidity inside the illumination unit 42, and change the illumination state (the turn on/off, the light emitting area, the illumination color, the blinking cycle and the luminous intensity) of the illumination unit based on the predicted lifetime of the illumination unit 42. For example, when it is predicted that the predicted lifetime of the illumination unit 42 is short (e.g., the predicted lifetime is 100 hours or less), the illumination control unit 43 may set the illumination color of the illumination unit 42 to a first illumination color (e.g., red). Further, when the predicted lifetime of the illumination unit 42 is within a predetermined range (e.g., the predicted lifetime is in the range of 100 hours to 500 hours), the illumination control unit 43 may set the illumination color of the illumination unit 42 to a second illumination color (e.g., yellow). Furthermore, when it is predicted that the predicted lifetime of the illumination unit 42 is long (e.g., the predicted lifetime is 500 hours or more), the illumination control unit 43 may set the illumination color of the illumination unit 42 to a third illumination color (e.g., green). Meanwhile, instead of the illumination control unit 43, the vehicle control unit 3 may predict the lifetime of the illumination unit 42. In this case, the illumination control unit 43 may receive data indicating the predicted lifetime of the illumination unit 42 from the vehicle control unit 3 and then change the illumination state of the illumination unit 42 based on the received data.

Here, a temperature sensor configured to measure the internal temperature of the illumination unit 42 and a humidity sensor configured to measure the internal humidity of the illumination unit 42 may be provided inside the illumination unit 42.

Next, an example of predicting the lifetime of the illumination unit 42 (in particular, the light emitting element provided in the illumination unit 42) based on the internal temperature of the illumination unit 42 will be described below. In this case, a lifetime prediction formula indicating the relationship between a use time t of the light emitting element and a luminance L of the light emitting element may be stored in a memory of the illumination control unit 43. The illumination control unit 43 may determine the predicted lifetime of the illumination unit 42 based on the lifetime prediction formula and the current luminance L of the light emitting element. Further, the lifetime prediction formula stored in the memory may be acquired from a server arranged on a communication network via the wireless communication unit 10. In this case, the illumination control unit 43 may periodically acquire the updated lifetime prediction formula from the server arranged on the communication network. For example, when the lifetime prediction formula stored in the memory is a lifetime prediction formula based on the indoor temperature of 30 degrees and the internal temperature of the illumination unit 42 acquired from the temperature sensor is 50 degrees, the illumination control unit 43 may acquire the lifetime prediction formula based on the indoor temperature of 50 degrees from the server and then determine the predicted lifetime of the illumination unit 42 based on the acquired lifetime prediction formula based on the indoor temperature of 50 degrees and the current luminance L of the light emitting element. In this way, a suitable lifetime prediction formula can be acquired via the communication network, so that the lifetime of the illumination unit 42 can be predicted more accurately. Furthermore, the illumination control unit 43 changes the illumination state of the illumination unit 42 in accordance with the predicted lifetime of the illumination unit 42, and thus, it is possible to present the information relating to the lifetime of the illumination unit 42 toward the outside of the vehicle. In this manner, pedestrians or the like existing outside the vehicle can grasp the lifetime of the illumination unit 42 by visually recognizing the illumination state of the illumination unit 42.

Further, the illumination control unit 43 may change the illumination state (the turn on/off, the light emitting area, the illumination color, the blinking cycle and the luminous intensity) of the illumination unit 42 based on the current condition of a driver. For example, in the case where one of the plurality of cameras 6 is configured to capture the driver, the vehicle control unit 3 may acquire the captured image of the driver from the camera 6 and then determine the current condition of the driver based on the acquired captured image and a face recognition algorithm. Here, when it is determined that the driver cannot drive (e.g., when it is determined that the driver is dozing), the vehicle control unit 3 generates a predetermined illumination control signal and then transmits the predetermined illumination control signal to the illumination control unit 43. The illumination control unit 43 may set the illumination color of the illumination unit 42 to a predetermined illumination color (e.g., red) based on the predetermined illumination control signal. In this manner, it is possible to present the information relating to the current condition of the driver toward the outside of the vehicle.

Further, in the first embodiment, instead of the illumination unit 42 or in addition to the illumination unit 42, a speaker (not shown) may output the stop warning guidance of the vehicle 1. For example, the speaker may be installed at a predetermined position of the vehicle so as to output the stop warning guidance of the vehicle 1 toward the outside of the vehicle. In this case, a speaker control unit (not shown) configured to control the speaker may store the data relating to the stop warning guidance of the vehicle 1. The speaker control unit receives a signal indicating the stop of the vehicle 1 from the vehicle control unit 3 and then outputs the stop voice guidance to the speaker in accordance with the received signal. By using the speaker in this way, the stop warning information of the vehicle 1 can be presented to pedestrians or other vehicles or the like existing outside the vehicle.

<Second Modification of Illumination Unit>

Figure 6:
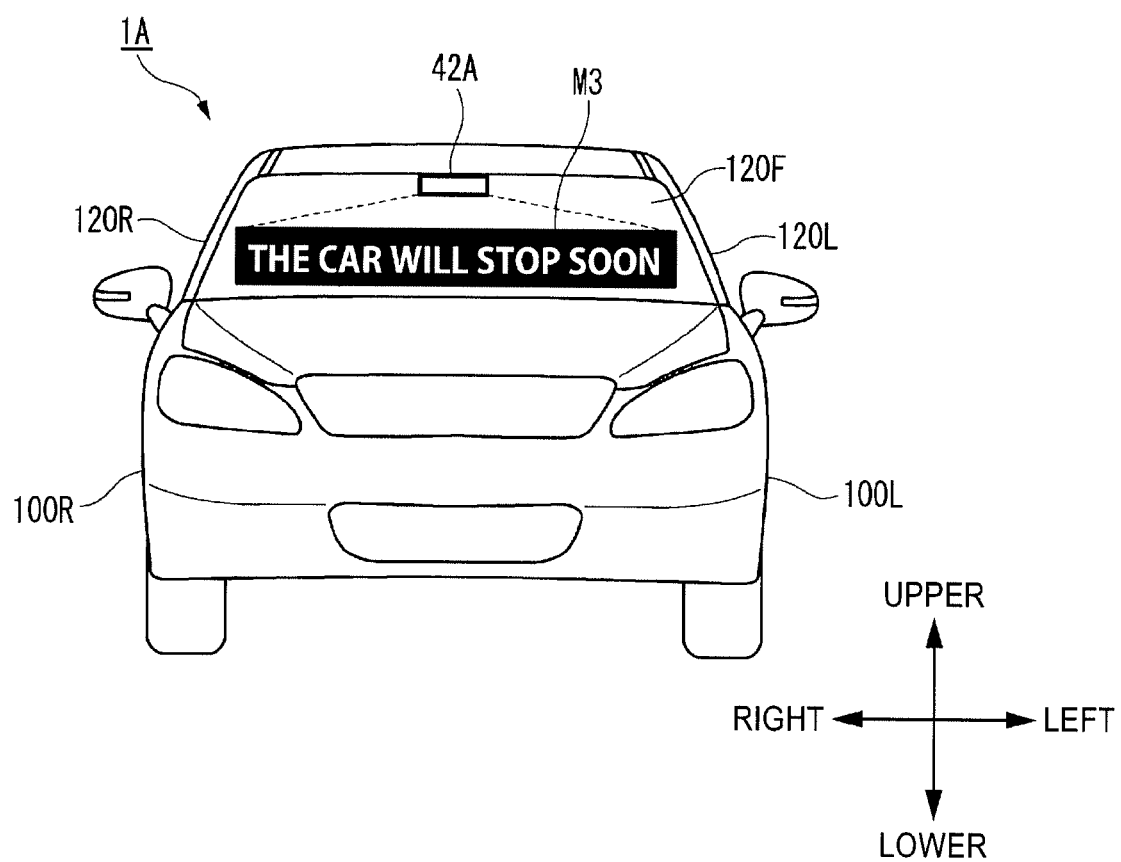
FIG. 6 is a front view of a vehicle on which an illumination unit according to a second modification is mounted.

Next, a second modification of the illumination unit will be described with reference to FIG. 6. FIG. 6 shows a front view of a vehicle 1A on which an illumination unit 42A according to the second modification is mounted. In the second modification, the illumination unit 42A displays character information M3 ("THE CAR WILL STOP SOON") as the stop warning information on a front window 120F of the vehicle 1A. The illumination unit 42A is a projection device such as a projector for projecting the character information M3 on the front window 120F and is arranged at a predetermined position on the front window 120F. The illumination control unit 43 drives and controls the illumination unit 42A based on the instruction signal received from the vehicle control unit 3. As a result, the stop warning information projected from the illumination unit 42A is displayed on the front window 120F of the vehicle 1.

In this manner, according to the second modification, since the character information M3 displayed on the front window 120F of the vehicle 1 is displayed as the stop warning information toward the front of the vehicle 1, the pedestrian P existing in front of the vehicle 1A can grasp in advance that the vehicle 1A is stopped by looking at the stop warning information.

Meanwhile, in the second modification, the illumination unit 42A is disposed on the front window 120F. However, the illumination unit 42A may be formed integrally with the front window 120F. In this case, the front window 120F itself functions as a display device for displaying the character information M3. Further, in addition to the illumination unit 42A, another illumination unit (not shown) may be disposed on side windows 120L, 120R, respectively. Furthermore, another illumination unit (not shown) may be disposed on the left surface 100L and the right surface 100R of the vehicle 1A, respectively. Further, the character information M3 shown in FIG. 6 is merely an example, and other character information and graphic information may be displayed on the front window 120F as the stop warning information.

Further, in the present embodiment, the illumination units 42, 42A for displaying the stop warning information have been described, respectively. However, the vehicle may include both the illumination unit 42 and the illumination unit 42A.

Second Embodiment

Hereinafter, a second embodiment will be described with reference to the drawings. Meanwhile, for the sake of convenience of explanation, the explanation of members having the same reference numerals as those already described in the description of the first embodiment will be omitted. Further, for the sake of convenience of explanation, dimensions of each member shown in the drawings may be different from actual dimensions of each member.

Figure 7A:
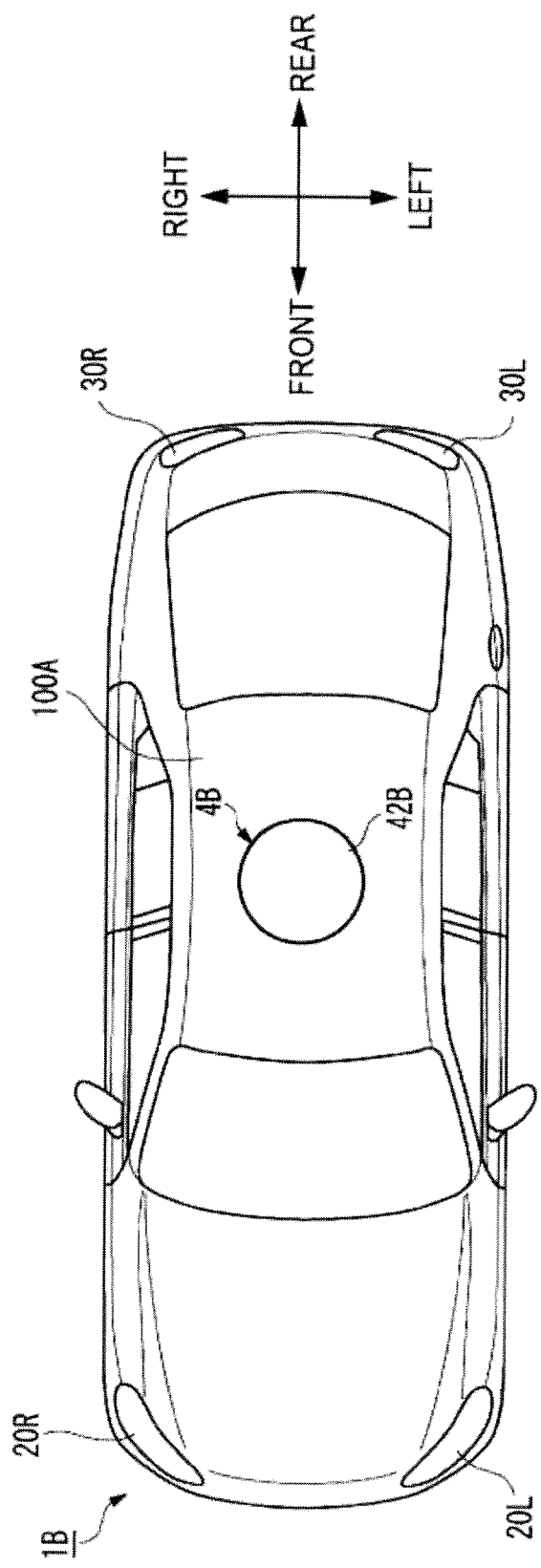
FIG. 7A is a plan view of a vehicle on which a vehicle illumination device according to a second embodiment of the present disclosure (hereinafter, simply referred to as a "second embodiment") is mounted.
Figure 7B:
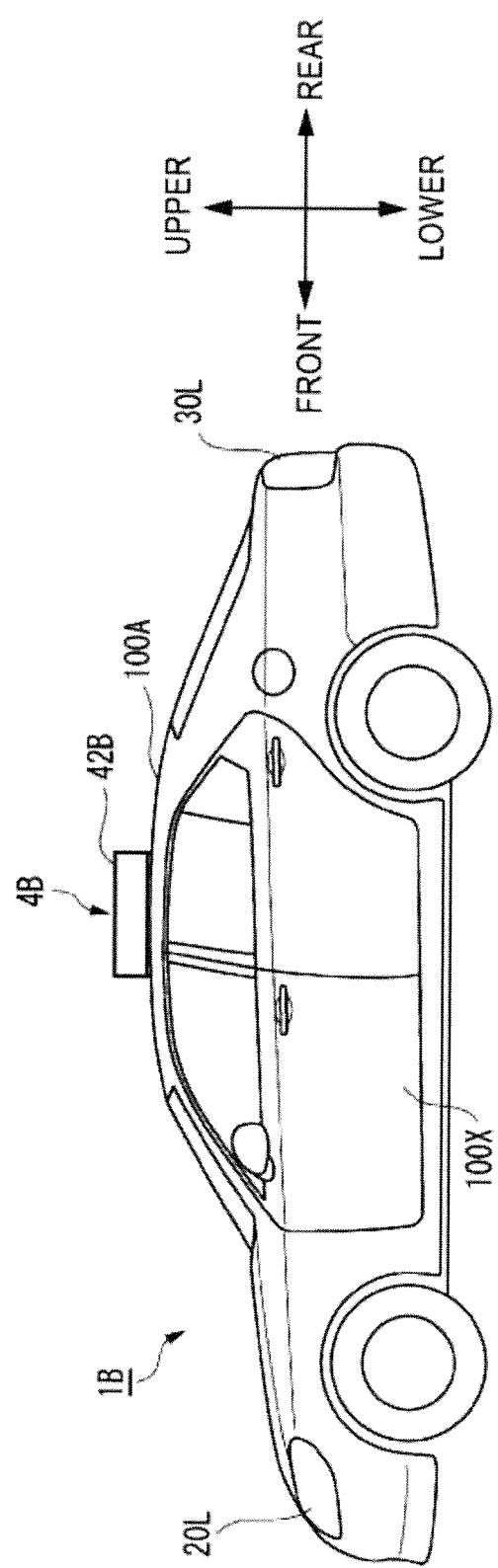
FIG. 7B is a left side view of the vehicle shown in FIG. 7A.

A vehicle illumination device 4B (hereinafter, simply referred to as the "illumination device 4B") according to the second embodiment will be described below. FIG. 7A shows a front view of a vehicle 1B, and FIG. 7B shows a left side view of the vehicle 1B. The vehicle 1B is a vehicle capable of travelling in an automatic driving mode and includes the illumination device 4B. The illumination device 4B includes an illumination unit 42B (first illumination unit) and the illumination control unit 43 (see FIG. 8). The illumination unit 42B is disposed on the vehicle body roof 100A of the vehicle 1B and is configured to irradiate a light pattern toward the outside of the vehicle 1B.

The illumination unit 42B (first illumination unit) is, for example, a laser scanning device that includes a laser light source and an optical deflection device for deflecting laser light emitted from the laser light source. The optical deflection device is, for example, a movable mirror such as an MEMS (Micro Electro Mechanical Systems) mirror or a galvanometer mirror. As will be described later, the illumination unit 42B scans laser light to irradiate a light pattern (e.g., a ring-shaped light pattern M1 or a linear light pattern M2 shown in FIG. 9) toward an object such as a pedestrian. In particular, the illumination unit 42B scans the laser light to draw a light pattern on a road surface around the object.

Meanwhile, in the second embodiment, the single illumination unit 42B is disposed on the vehicle body roof 100A. However, the number, arrangement and shape or the like of the illumination unit 42B are not particularly limited, so long as the illumination unit 42B can irradiate a light pattern toward an object existing in an arbitrary direction with respect to the vehicle 1B. For example, each of two illumination units 42B among four illumination units 42B may be disposed in the left headlamp 20L and the right headlamp 20R, and each of the remaining two illumination units 42B may be disposed in a left rear combination lamp 30L and a right rear combination lamp 30R. Furthermore, the illumination unit 42B may be arranged so as to surround a side surface 100X of the vehicle 1B.

Figure 8:
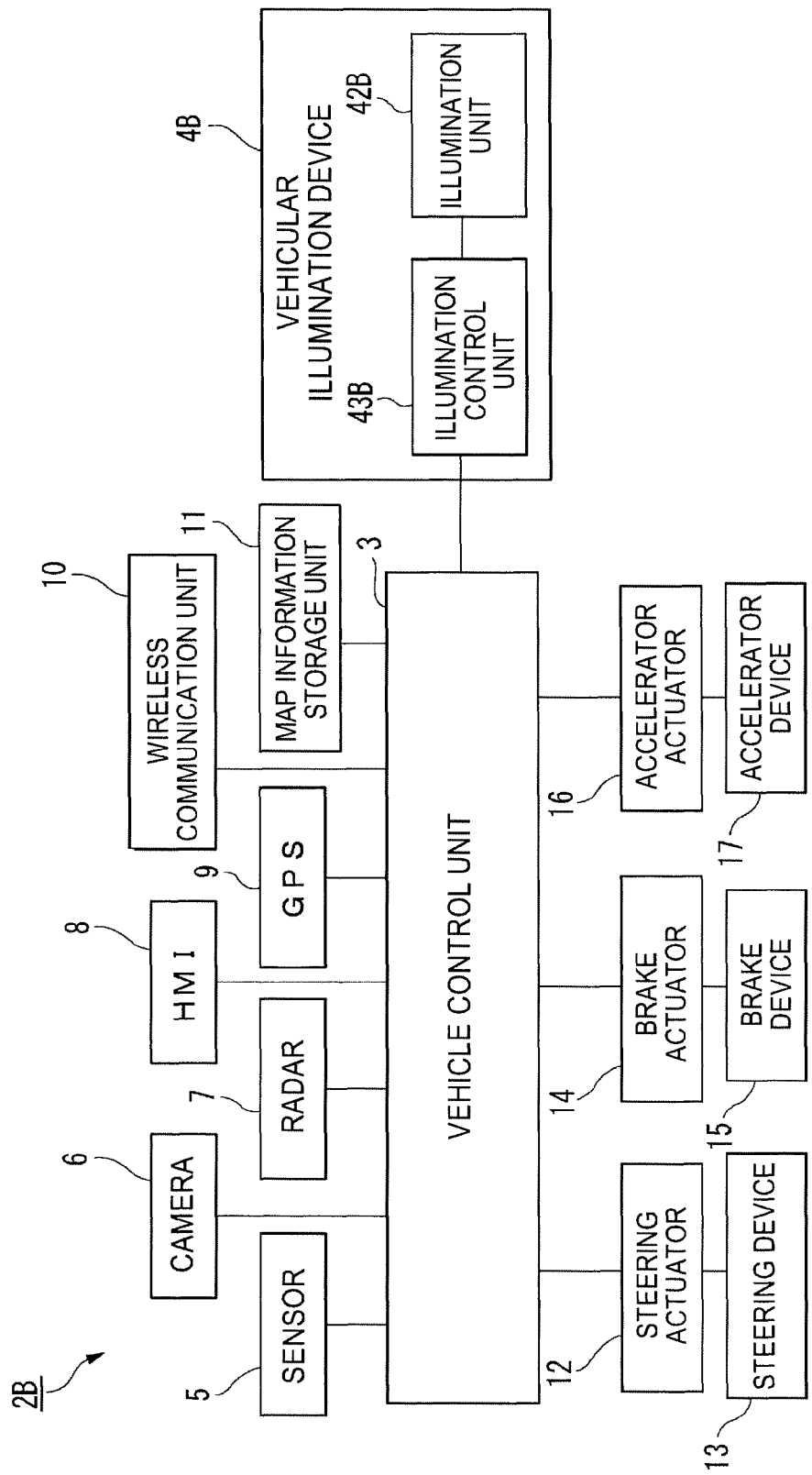
FIG. 8 is a block diagram of a vehicle system including the vehicle illumination device according to the second embodiment.

Next, a vehicle system 2B of the vehicle 1 will be described with reference to FIG. 8. FIG. 8 shows a block diagram of the vehicle system 2B. As shown in FIG. 8, the vehicle system 2B includes the vehicle control unit 3, the illumination device 4B, the sensor 5, the camera 6, the radar 7, the HMI (Human Machine Interface) 8, the GPS (Global Positioning System) 9, the wireless communication unit 10 (first wireless communication unit), and the map information storage unit 11. The vehicle system 2B further includes the steering actuator 12, the steering device 13, the brake actuator 14, the brake device 15, the accelerator actuator 16, and the accelerator device 17.

The illumination device 4B is configured to irradiate laser light (in particular, a light pattern having a ring shape or a linear shape) toward the outside (in particular, an object such as a pedestrian or an emergency vehicle) of the vehicle 1B, and includes the illumination unit 42B and an illumination control unit 43B. The illumination control unit 43B is configured by an electronic control unit (ECU). The illumination control unit 43B is configured to control the illumination unit 42B so that the laser light is irradiated toward the object, based on the position information of the object.

<Case in which an Object Illuminated with a Light Pattern is a Pedestrian>

Figure 9:
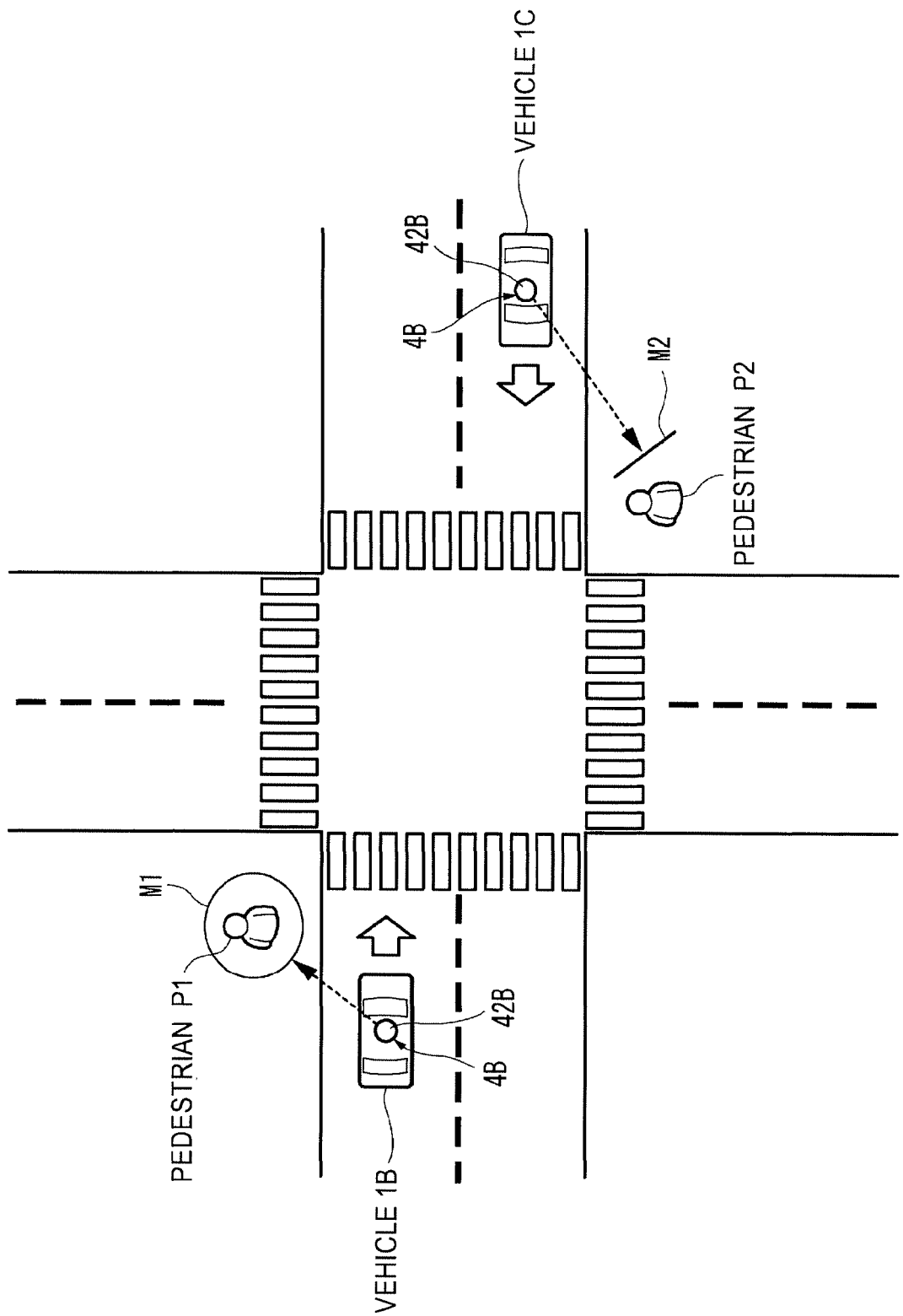
FIG. 9 is a view showing a state in which an illumination unit irradiates a light pattern toward a pedestrian.
Figure 10:
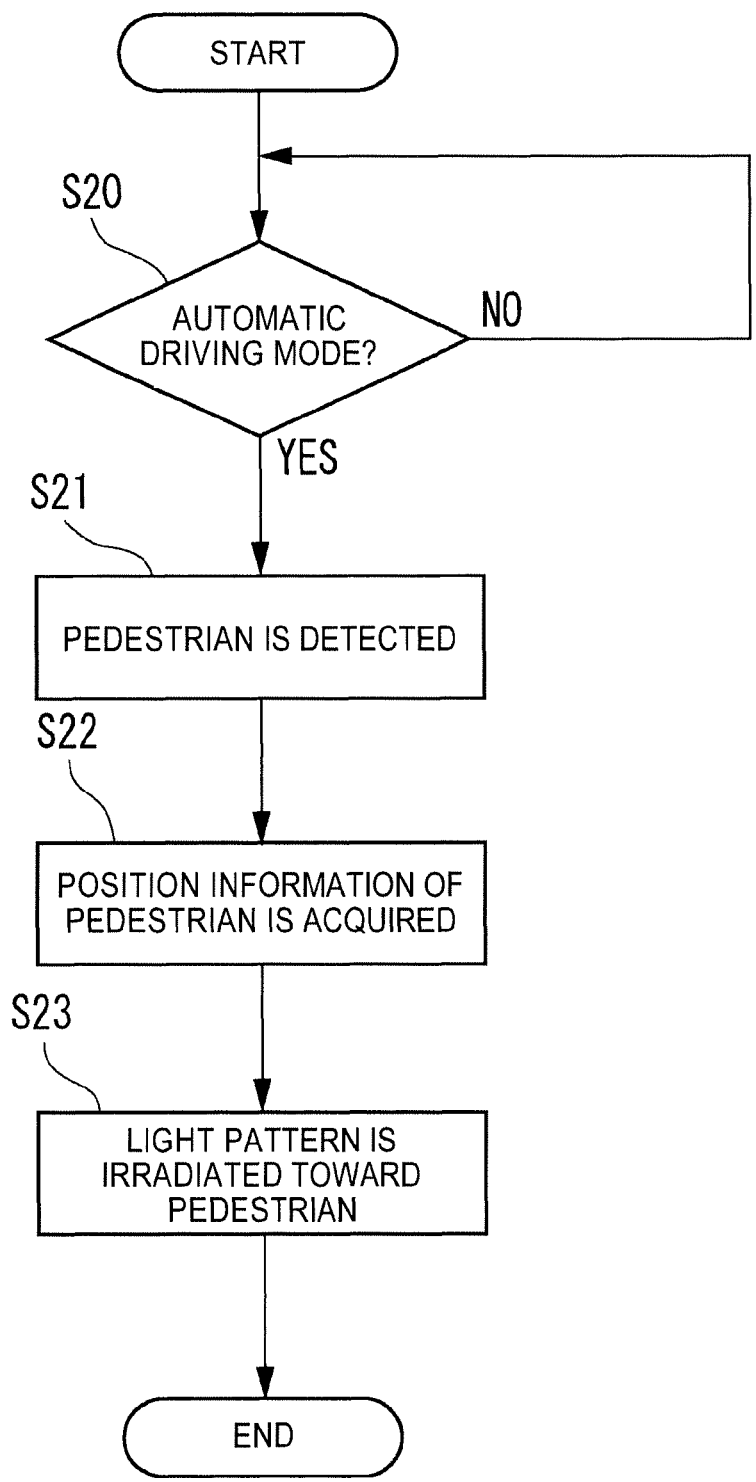
FIG. 10 is a flowchart showing a process of irradiating a light pattern toward a pedestrian.

Next, a process of irradiating a light pattern toward a pedestrian as an object will be described with reference to FIGS. 9 and 10. FIG. 9 shows a state in which the illumination unit 42B irradiates a light pattern toward a pedestrian. FIG. 10 is a flowchart showing a process of irradiating a light pattern toward a pedestrian.

As shown in FIG. 10, first, the vehicle control unit 3 determines whether the driving mode of the vehicle 1B is the automatic driving mode (Step S20). When the vehicle control unit 3 determines that the driving mode of the vehicle 1B is the automatic driving mode (YES in Step S20), the process proceeds to Step S21. On the other hand, when it is determined that the driving mode of the vehicle 1B is not the automatic driving mode (that is, when it is determined that the driving mode of the vehicle 1B is the manual driving mode) (NO in Step S20), the vehicle control unit 3 waits until the driving mode of the vehicle 1B becomes the automatic driving mode.

Subsequently, in Step S21, the vehicle control unit 3 (detection unit) detects a pedestrian P1 (see FIG. 9) by using the camera 6 and/or the radar 7. In particular, the vehicle control unit 3 detects the pedestrian P1 based on the surrounding environment information acquired from the camera 6 and/or the radar 7.

Subsequently, in Step S22, the vehicle control unit 3 (position information acquisition unit) acquires position information of the pedestrian P1 based on the acquired surrounding environment information. Then, the vehicle control unit 3 generates an instruction signal for instructing to irradiate a light pattern and transmits the instruction signal and the position information of the pedestrian P1 to the illumination control unit 43B. Then, the illumination control unit 43B drives and controls the illumination unit 42B in accordance with the received instruction signal. Furthermore, the illumination control unit 43B controls the illumination unit 42B so that a light pattern is irradiated toward the pedestrian P1, based on the received position information. In particular, the optical deflection device of the illumination unit 42 scans the laser light emitted from the laser light source on a road surface around the pedestrian P1. As a result, the ring-shaped light pattern M1 (see FIG. 9) formed by the laser scanning is irradiated toward the pedestrian P1. In particular, the light pattern M1 is drawn on a road surface around the pedestrian P1.

Further, as shown in FIG. 9, the linear light pattern M2 may be irradiated to a pedestrian P2 from the illumination unit 42B of a vehicle 1C having the same configuration as that of the vehicle 1B. In this case, the linear light pattern M2 is drawn on a road surface in front of the pedestrian P2. In this manner, a light pattern having a ring shape or linear shape may be irradiated from the illumination unit 42B or a light pattern having other shapes may be irradiated from the illumination unit 42B. Further, instead of the light pattern formed by the laser scanning, the laser light may be merely irradiated to a pedestrian.

According to this embodiment, it is possible to provide the illumination device 4B which can present, toward a pedestrian, the fact that the vehicle 1B capable of travelling in the automatic driving mode is recognizing the pedestrian. In this manner, the pedestrian can grasp that the vehicle 1B is recognizing the pedestrian by looking at the ring-shaped light pattern or the linear light pattern irradiated from the illumination unit 42B, so that the pedestrian can be relieved. In particular, a pedestrian trying to cross a crosswalk or the like can grasp that the vehicle 1B is recognizing the pedestrian by looking at the light pattern irradiated from the illumination unit 42B, so that the pedestrian can safely cross the crosswalk or the like.

Meanwhile, in Step S20, the vehicle control unit 3 determines whether the driving mode of the vehicle 1B is the automatic driving mode. However, instead of this, the vehicle control unit 3 may determine whether the driving mode of the vehicle 1B is the automatic driving mode excluding the driving support mode. That is, since a pedestrian cannot confirm the state and sign of a driver in the case where the vehicle 1B is travelling in the fully automatic driving mode or the advanced driving support mode, it is difficult to judge whether the vehicle 1B recognizes the pedestrian. Therefore, when the driving mode is the fully automatic driving mode or the advanced driving support mode, it is especially beneficial to irradiate a light pattern toward a pedestrian. Further, in this process, Step S20 may be omitted. For example, even when the driving mode of the vehicle 1B is the manual driving mode, a light pattern may be irradiated toward an object (that is, Steps S21 to S23 may be executed). In this case, this process may be executed by a driver of the vehicle 1B performing a predetermined operation (such as an operation of pressing a predetermined switch).

Further, the vehicle control unit 3 functions as a detecting unit for detecting the pedestrian P1 and a position information acquisition unit for acquiring position information of the pedestrian P1. However, instead of this, the camera 6 and/or the radar 7 may function as the detecting unit for detecting the pedestrian P1 and/or the position information acquisition unit for acquiring position information of the pedestrian P1. Further, the vehicle control unit 3 transmits the instruction signal and the position information to the illumination control unit 43B. However, the vehicle control unit 3 may transmit only the position information to the illumination control unit 43B.

Further, the vehicle control unit 3 may detect the pedestrian P1 and acquire position information of the pedestrian P1 by pedestrian-to-vehicle communication via the wireless communication unit 10, instead of the camera 6 and/or the radar 7. In this case, the wireless communication unit 10 receives position information or the like of the pedestrian P1 from a mobile terminal such as a mobile phone, a smart phone, a tablet or a wearable device carried by the pedestrian and provides the position information or the like to the vehicle control unit 3.

Further, the vehicle control unit 3 may detect the pedestrian P1 and acquire position information of the pedestrian P1 by road-to-vehicle communication via the wireless communication unit 10. For example, infrastructure equipment existing in the vicinity of the pedestrian P1 includes an image acquisition means such as a camera capable of acquiring an image of the pedestrian P1. The infrastructure equipment detects the presence of the pedestrian P1 by the image acquisition means and acquires position information of the pedestrian P1. The wireless communication unit 10 receives the position information or the like of the pedestrian P1 from the infrastructure equipment and provides the position information or the like to the vehicle control unit 3.

Further, in the second embodiment, the illumination unit 42B irradiates a light pattern toward the pedestrian P1 existing in the vicinity of an intersection. However, the position of the pedestrian P1 is not particularly limited. The illumination unit 42B may irradiate a light pattern toward a pedestrian existing at a position distant from an intersection. Furthermore, the illumination unit 42B may irradiate a light pattern toward a plurality of pedestrians. Further, the object to which a light pattern is irradiated is not limited to a pedestrian, but may be a person riding a bicycle, a person riding on a senior car (Senior Car (registered trademark)) or a person walking on a sidewalk.

<Case in which an Object Illuminated with a Light Pattern is an Emergency Vehicle>

Figure 11:
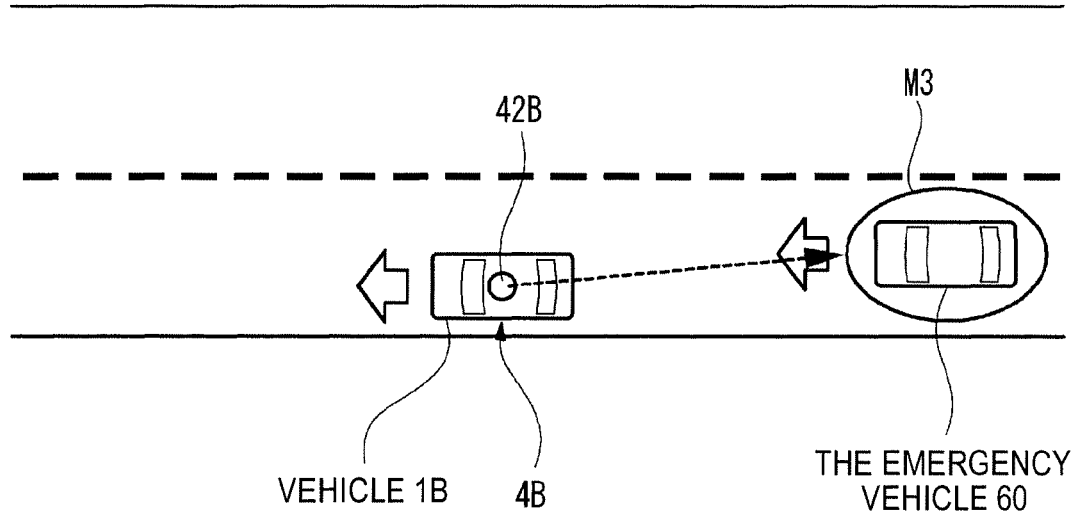
FIG. 11 is a view showing a state in which an illumination unit irradiates a light pattern toward an emergency vehicle.
Figure 12:
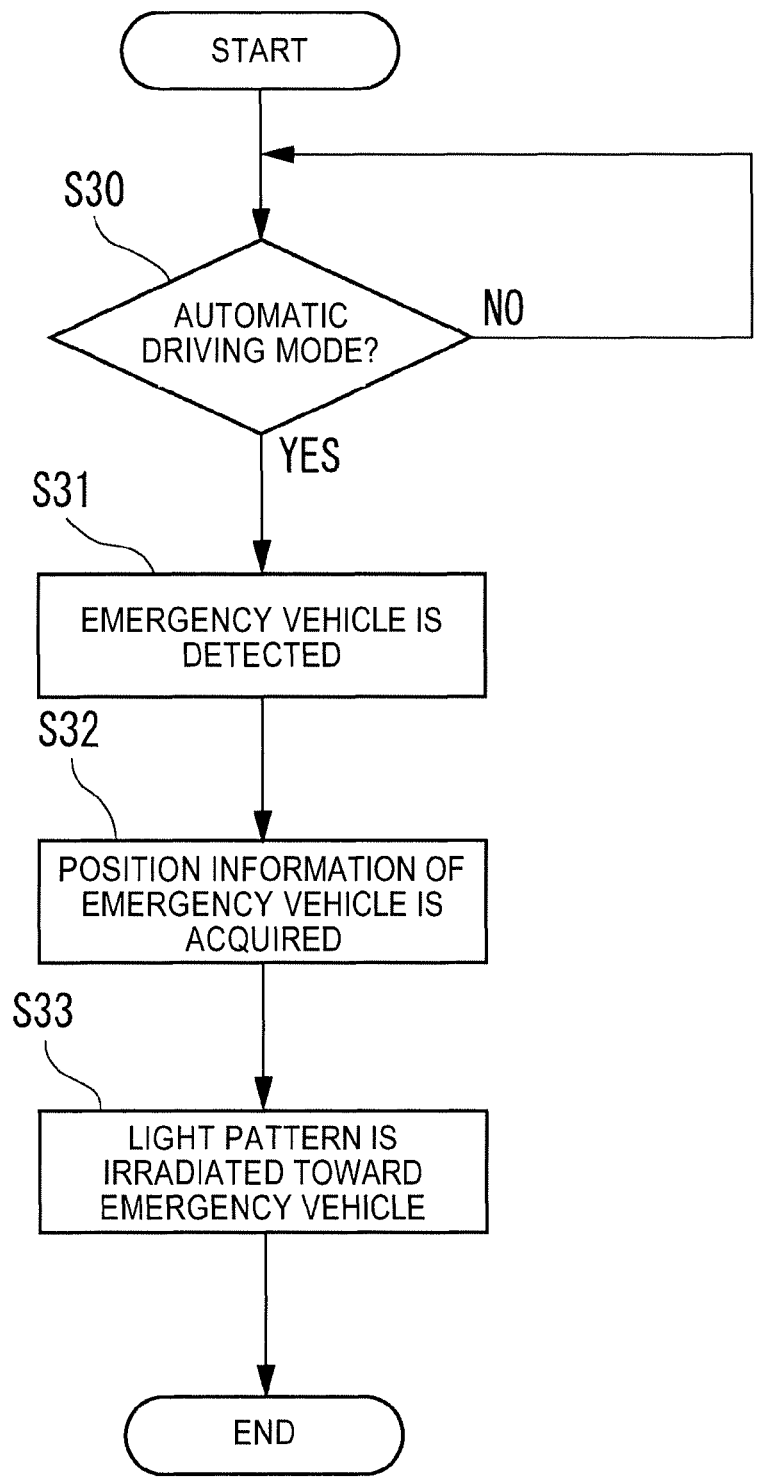
FIG. 12 is a flowchart showing a process of irradiating a light pattern toward an emergency vehicle.

Next, a process of irradiating a light pattern toward an emergency vehicle (an ambulance, a patrol car, a fire truck, etc.) as an object will be described with reference to FIGS. 11 and 12. FIG. 11 shows a state in which the illumination unit 42B irradiates a light pattern toward an emergency vehicle 60. FIG. 12 is a flowchart showing a process of irradiating a light pattern toward the emergency vehicle 60.

As shown in FIG. 12, the vehicle control unit 3 determines whether the driving mode of the vehicle 1B is the automatic driving mode (Step S30). Since Step S30 corresponds to Step S20 shown in FIG. 10, the description thereof will be omitted here.

Subsequently, in Step S31, the vehicle control unit 3 (detection unit) detects the emergency vehicle 60 (see FIG. 11) by using the camera 6 and/or the radar 7. In particular, the vehicle control unit 3 detects the emergency vehicle 60 based on the surrounding environment information acquired from the camera 6 and/or the radar 7.

Subsequently, in Step S32, the vehicle control unit 3 (position information acquisition unit) acquires position information of the emergency vehicle 60 based on the acquired surrounding environment information. Then, the vehicle control unit 3 generates an instruction signal for instructing to irradiate a light pattern and transmits the instruction signal and the position information of the emergency vehicle 60 to the illumination control unit 43B. Then, the illumination control unit 43B drives and controls the illumination unit 42B in accordance with the received instruction signal. Further, the illumination control unit 43B controls the illumination unit 42B so that a light pattern is irradiated toward the emergency vehicle 60, based on the received position information. As a result, a ring-shaped light pattern M3 (see FIG. 11) formed by laser scanning is irradiated toward the emergency vehicle 60. In particular, the light pattern M3 is drawn on a road surface around the emergency vehicle 60. Meanwhile, instead of the ring-shaped light pattern, a light pattern having other shapes may be irradiated.

According to this embodiment, it is possible to provide the illumination device 4B which can present, toward the emergency vehicle 60, the fact that the vehicle 1B capable of travelling in the automatic driving mode is recognizing the emergency vehicle 60. In this manner, a driver of the emergency vehicle 60 can grasp that the vehicle 1B is recognizing the emergency vehicle 60 by looking at the ring-shaped light pattern irradiated from the illumination unit 42B, so that the driver of the emergency vehicle 60 can safely overtake the vehicle 1B.

Meanwhile, the vehicle control unit 3 may detect the emergency vehicle 60 and acquire position information of the emergency vehicle 60 by vehicle-to-vehicle communication via the wireless communication unit 10. In this case, the wireless communication unit 10 receives the position information or the like of the emergency vehicle 60 from a wireless communication unit of the emergency vehicle 60 and provides the position information or the like to the vehicle control unit 3. Further, the vehicle control unit 3 may detect the emergency vehicle 60 and acquire position information of the emergency vehicle 60 by using a sound sensor.

<System for Vehicle Including Vehicle System and Mobile Terminal>

Next, a system for vehicle 300 including a vehicle system 2C and a mobile terminal 50 will be described with reference to FIG. 13. The system for vehicle 300 includes the vehicle system 2C and the mobile terminal 50. The vehicle system 2C has the same configuration as the vehicle system 2B shown in FIG. 8 except for a vehicle illumination device 4C. In the following, the description of the components having the same reference numerals as the components described above will be appropriately omitted.

The vehicle illumination device 4C (hereinafter, simply referred to as the "illumination device 4C") includes an illumination control unit 43C, the illumination unit 42B, and an illumination unit 45 (second illumination unit). The illumination unit 45 (not shown) is disposed on the vehicle body roof 100A shown in FIGS. 7A and 7B and is configured to irradiate light toward the outside of the vehicle 1B and over the entire circumference of the vehicle 1B in the horizontal direction. Here, the horizontal direction is a plane direction that includes a front-rear direction and a left-right direction and that is perpendicular to the vertical direction. The illumination unit 45 includes one or more light emitting elements such as an LED (Light Emitting Diode), for example. Meanwhile, the illumination unit 45 may be arranged so as to surround the side surface 100X of the vehicle 1B or may be formed integrally with the illumination unit 42B (e.g., the illumination unit 45 may be disposed in the illumination unit 42B).

The illumination control unit 43C is configured by an electronic control unit (ECU). The illumination control unit 43C is configured to control the illumination unit 42B so that a light pattern is irradiated toward an object such as a pedestrian or an emergency vehicle. Further, the illumination control unit 43C is configured to control the illumination state (illumination color, blinking, etc.) of the illumination unit 45. In particular, the illumination control unit 43C is configured to control the illumination unit 45 so that the illumination state of the illumination unit 45 corresponds to an illumination state of a display unit 53 of the mobile terminal 50.

Next, a configuration of the mobile terminal 50 will be described. The mobile terminal 50 is, for example, a mobile phone, a smart phone, a tablet or a wearable device (e.g., Apple Watch or Google Glass (registered trademark)) and is carried by a pedestrian. Meanwhile, the mobile terminal 50 may be carried by a person riding a bicycle, a person riding on a senior car or a person walking on a sidewalk. In the following description, it is assumed that the mobile terminal 50 is carried by the pedestrian P1 shown in FIG. 9. The mobile terminal 50 includes a wireless communication unit 51 (second wireless communication unit), a control unit 52, and the display unit 53. The wireless communication unit 51 is configured to perform wireless communication with the wireless communication unit 10 of the vehicle system 2C. The wireless communication unit 51 may directly communicate with the wireless communication unit 10 in an ad hoc mode or may communicate with the wireless communication unit 10 via an access point. The display unit 53 is, for example, a display device for displaying information and is configured to irradiate light. The control unit 52 is configured to control an illumination state (illumination color, blinking, etc.) of the display unit 53. In particular, the control unit 52 is configured to control the display unit 53 so that the illumination state of the display unit 53 corresponds to the illumination state of the illumination unit 45.

Next, a process of controlling the illumination state of the display unit 53 will be described below.

First, the vehicle control unit 3 detects the pedestrian P1 shown in FIG. 9 and acquires position information of the pedestrian P1. Then, the vehicle control unit 3 transmits a communication request signal to the pedestrian P1 via the wireless communication unit 10 in order to establish wireless communication (ad hoc communication) between the vehicle system 2C and the mobile terminal 50 of the pedestrian P1. Then, the wireless communication unit 51 of the mobile terminal 50 receives the communication request signal, and then, the control unit 52 performs a predetermined process. Then, the wireless communication unit 51 transmits a response signal to the communication request signal to the wireless communication unit 10. In this way, the wireless communication between the vehicle system 2A and the mobile terminal 50 is established.

Subsequently, the vehicle control unit 3 generates an illumination control signal including information relating to the illumination state of the illumination unit 45. Further, the wireless communication unit 10 transmits the illumination control signal to the wireless communication unit 51. When the wireless communication unit 51 receives the illumination control signal from the wireless communication unit 10, the control unit 52 controls the display unit 53 so that the illumination state of the display unit 53 corresponds to the illumination state of the illumination unit 45, based on the received illumination control signal. For example, the control unit 52 controls the display unit 53 so that the illumination color of the display unit 53 is the same as the illumination color of the illumination unit 45. Further, the control unit 52 controls the display unit 53 so that the display unit 53 blinks in synchronization with the illumination unit 45.

In the above description, the process of controlling the illumination state of the display unit 53 has been described. Now, on the contrary, a process of controlling the illumination state of the illumination unit 45 will be described.

First, after the wireless communication between the vehicle system 2C and the mobile terminal 50 is established, the control unit 52 generates an illumination control signal including information relating to the illumination state of the display unit 53. Further, the wireless communication unit 51 transmits the illumination control signal to the wireless communication unit 10. When the wireless communication unit 10 receives the illumination control signal from the wireless communication unit 51, the received illumination control signal is transmitted to the illumination control unit 43C. Then, the illumination control unit 43C controls the illumination unit 45 so that the illumination state of the illumination unit 45 corresponds to the illumination state of the display unit 53, based on the illumination control signal. For example, the illumination control unit 43C controls the illumination unit 45 so that the illumination color of the illumination unit 45 is the same as the illumination color of the display unit 53. Further, the illumination control unit 43C controls the illumination unit 45 so that the illumination unit 45 blinks in synchronization with the display unit 53.

In this manner, according to this embodiment, the pedestrian P1 carrying the mobile terminal 50 can graph that the vehicle 1 is recognizing the pedestrian P1 by looking at not only the ring-shaped light pattern M1 irradiated from the illumination unit 42 but also the illumination state of the illumination unit 45 and the illumination state of the display unit 53 of the mobile terminal 50, so that the pedestrian P1 can safely cross a crosswalk or the like. In particular, since the illumination state of the illumination unit 45 corresponds to the illumination state of the display unit 53 of the mobile terminal 50, the pedestrian P1 can grasp that the vehicle 1B is recognizing the pedestrian P1.

Meanwhile, in this embodiment, two illumination units of the illumination unit 42B and the illumination unit 45 are provided. However, instead of this, the above effects may be realized only by the illumination unit 42B. For example, the illumination state (illumination color, synchronous blinking) of the light pattern M1 irradiated from the illumination unit 42B may correspond to the illumination state of the display unit 53 while the illumination unit 42B irradiates the light pattern M1 toward the pedestrian. That is, the illumination color of the light pattern M1 may be the same as the illumination color of the display unit 53, or the light pattern M1 may blink in synchronization with the display unit 53.

Further, the control unit 52 controls the display unit 53 so that the illumination state of the display unit 53 corresponds to the illumination state of the illumination unit 45. However, in addition to this, the control unit 52 may control a speaker (not shown) so that an alarm sound is outputted from the speaker. For example, the control unit 52 may change the alarm sound outputted from the speaker so as to be synchronized with the blinking of the display unit 53.

<System for Vehicle Including Vehicle System and Emergency Vehicle>

Figure 14:
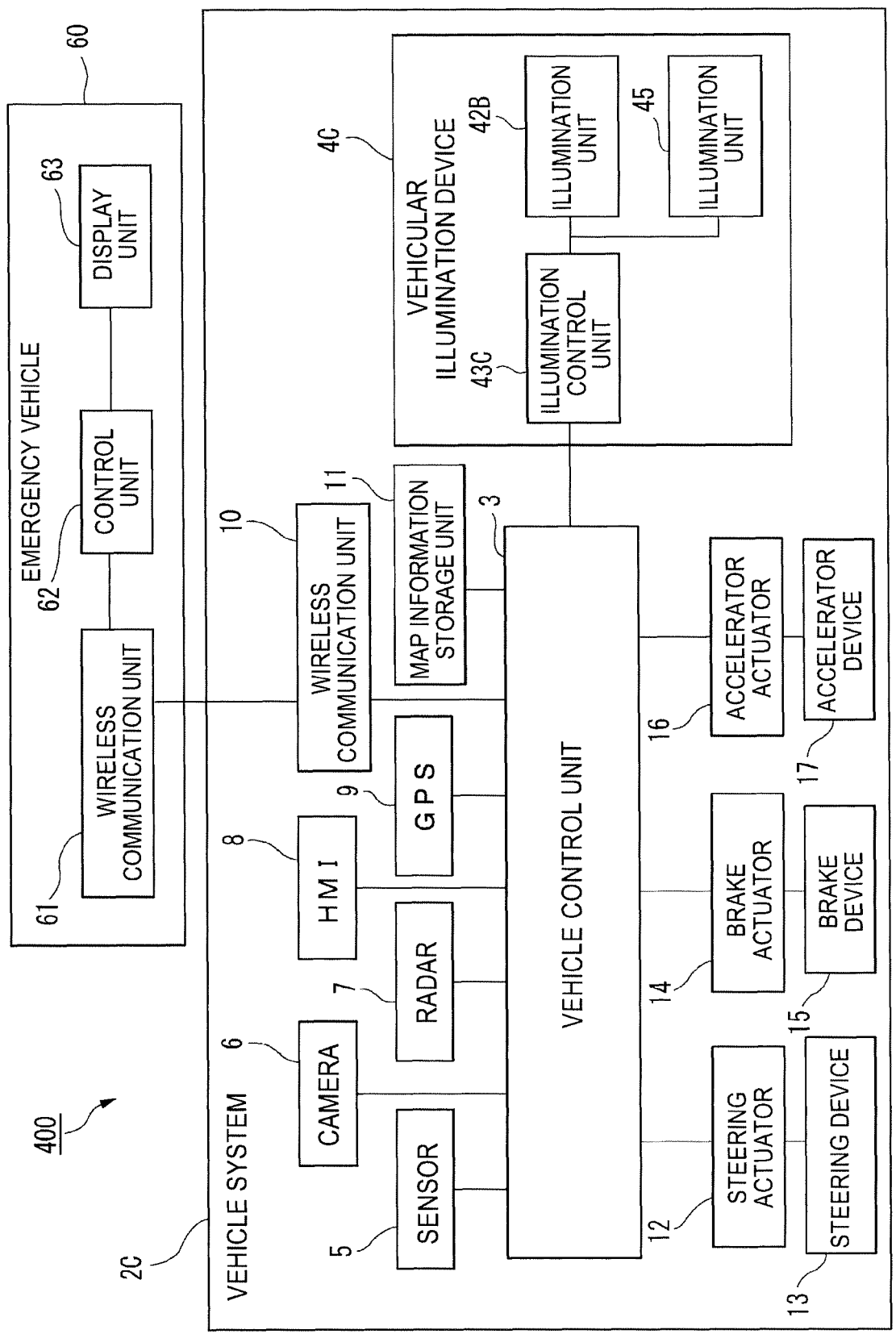
FIG. 14 is a block diagram showing a system for vehicle including a vehicle system and an emergency vehicle.

Next, a system for vehicle 400 including the vehicle system 2C and the emergency vehicle 60 will be described with reference to FIG. 14. The system for vehicle 400 includes the vehicle system 2C and the emergency vehicle 60. The emergency vehicle 60 includes a wireless communication unit 61 (second wireless communication unit), a control unit 62, and a display unit 63. The wireless communication unit 61 is configured to perform wireless communication (ad hoc communication) with the wireless communication unit 10 of the vehicle system 2C. The wireless communication unit 61 may directly communicate with the wireless communication unit 10 in an ad hoc mode or may communicate with the wireless communication unit 10 via an access point. The display unit 63 is, for example, an indicator displayed toward a driver and is configured to irradiate light. The control unit 62 is configured to control the illumination state (illumination color, blinking, etc.) of the display unit 63. In particular, the control unit 62 controls the display unit 63 so that the illumination state of the display unit 63 corresponds to the illumination state of the illumination unit 45.

Figure 13:
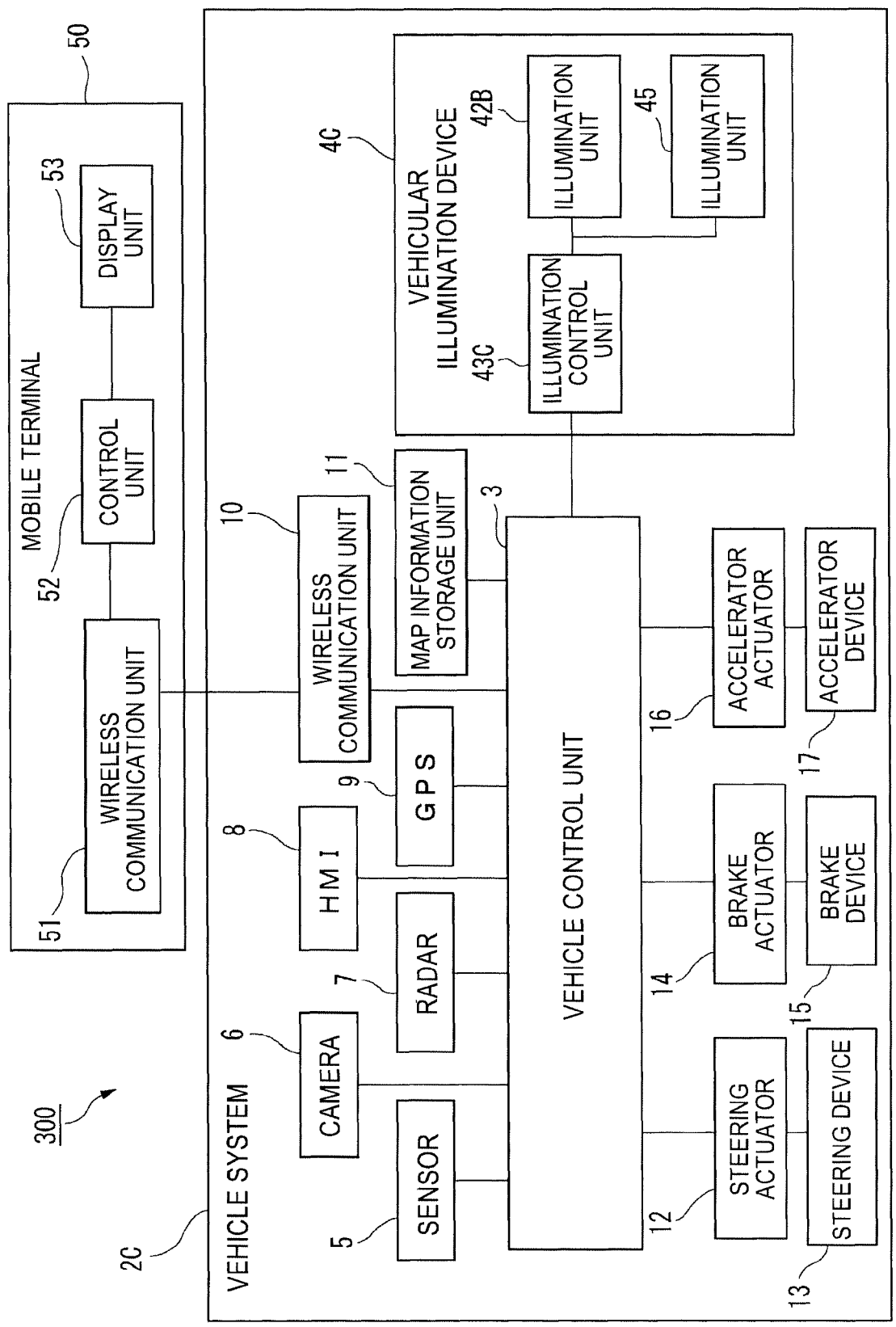
FIG. 13 is a block diagram showing a system for vehicle including a vehicle system and a mobile terminal.

Meanwhile, the process of controlling the illumination state of the display unit 63 is substantially the same as the process of controlling the illumination state of the display unit 53 shown in FIG. 13. That is, when the wireless communication unit 61 receives a lighting control signal from the wireless communication unit 10, the control unit 62 controls the display unit 63 so that the illumination state of the display unit 63 corresponds to the illumination state of the illumination unit 45, based on the received lighting control signal.

Furthermore, the process of controlling the illumination state of the illumination unit 45 is substantially the same as the process of controlling the illumination state of the illumination unit 45 shown in FIG. 13. That is, when the wireless communication unit 10 receives a lighting control signal from the wireless communication unit 61, the illumination control unit 43C controls the illumination unit 45 so that the illumination state of the illumination unit 45 corresponds to the illumination state of the display unit 63, based on the received lighting control signal.

In this manner, according to this embodiment, the driver of the emergency vehicle 60 can grasp that the vehicle 1 is recognizing the emergency vehicle 60 by looking at not only the light pattern M3 (see FIG. 11) irradiated from the illumination unit 42 but also the illumination state of the illumination unit 45 and the illumination state of the display unit 63 of the emergency vehicle 60, so that the driver can safely overtake the vehicle 1B. In particular, since the illumination state of the illumination unit 45 corresponds to the illumination state of the display unit 63, the driver of the emergency vehicle 60 can grasp that the vehicle 1B is recognizing the emergency vehicle 60.

Although the embodiments of the present disclosure have been described above, it goes without saying that the technical scope of the present disclosure should not be interpreted limitedly by the description of these embodiments. It will be understood by those killed in the art that these embodiments are merely examples and that various modifications can be made within the scope of the invention described in the claims. The technical scope of the present disclosure should be determined based on the scope of the invention described in the claims and its equivalent scope.

In each of the embodiments, the driving mode of the vehicle includes the fully automatic driving mode, the advanced driving support mode, the driving support mode, and the manual driving mode. However, the driving mode of the vehicle should not be limited to these four modes. The classification of the driving mode of the vehicle may be appropriately changed in accordance with the laws and regulations pertaining to the automatic driving in each country. Similarly, the definitions of "the fully automatic driving mode," "the advanced driving support mode," and "the driving support mode" described in the description of these embodiments are merely examples, and these definitions may be appropriately changed in accordance with the laws and regulations pertaining to the automatic driving in each country.

Further, in each of the embodiments, the illumination control unit may set the illumination state (the turn on/off, the light emitting area, the illumination color, the blinking cycle and the luminous intensity) of the illumination unit to a predetermined illumination state in accordance with the following information.

Information indicating the transition state of the driving mode of the vehicle

Information indicating that the vehicle is travelling in the fully automatic driving mode in a state where no occupant exists in a driver's seat of the vehicle Information indicating that the vehicle is travelling in the fully automatic driving mode in a state where an occupant exists in the vehicle Stop Warning Information forewarning the stop of the vehicle Information indicating that the automatic driving control of the vehicle is in an abnormal state Information indicating whether it is possible to ride on the vehicle travelling in the fully automatic driving mode Information indicating the abnormality of a component (brake, tire, etc.) of the vehicle Information indicating whether the vehicle is connected to a communication network Information indicating the abnormality of a camera, a radar, etc.

Information indicating the abnormality in occupant's vital sign

Information indicating the capacity of a battery mounted on the vehicle

The invention claimed is:

1. A vehicle system which is provided in a vehicle capable of travelling in an automatic driving mode, the vehicle system comprising:
a first illumination unit configured to irradiate light toward an outside of the vehicle;
a detector that detects an emergency vehicle and acquires position information of the emergency vehicle; and
a vehicle controller configured to, upon detection of an emergency vehicle notify the emergency vehicle by controlling the first illumination unit to irradiate light to the emergency vehicle based on the position information of the emergency vehicle.

2. The vehicle system according to claim 1,
wherein the first illumination unit is configured to irradiate a light pattern which has a ring shape or a linear shape toward the outside of the vehicle, and
wherein the vehicle controller is configured to control the first illumination unit to irradiate the light pattern toward the emergency vehicle based on the position information of the emergency vehicle.

3. A vehicle comprising the vehicle system according to claim 1.

4. A vehicle system comprising:
a detector configured to detect an object;
a position information acquisition unit configured to acquire position information of the object;
a vehicle illumination device which is provided in a vehicle capable of travelling in an automatic driving mode, comprising:
a first illumination unit configured to irradiate light toward an outside of the vehicle; and
an illumination controller configured to control the first illumination unit to irradiate light to the object based on position information of the object, and
a mobile terminal,
wherein the object is a pedestrian carrying the mobile terminal,
wherein the vehicle system further includes a first wireless communication unit configured to transmit or receive an illumination control signal,
wherein the vehicle illumination device further includes a second illumination unit configured to irradiate light toward the outside of the vehicle,
wherein the mobile terminal includes:
a second wireless communication unit configured to transmit or receive the illumination control signal;
a display unit configured to irradiate light; and
a controller configured to control an illumination state of the display unit, and
wherein:
(A) when the first wireless communication unit receives the illumination control signal from the second wireless communication unit, the illumination controller controls the second illumination unit such that the illumination state of the second illumination unit corresponds to the illumination state of the display unit, based on the received illumination control signal, or
(B) when the second wireless communication unit receives the illumination control signal from the first wireless communication unit, the controller controls the display unit such that the illumination state of the display unit corresponds to the illumination state of the second illumination unit, based on the received illumination control signal.

5. The vehicle system according to claim 1, further comprising:
the emergency vehicle,
wherein the vehicle system further includes a first wireless communication unit configured to transmit or receive an illumination control signal,
wherein the vehicle system further includes a second illumination unit configured to irradiate light toward the outside of the vehicle,
wherein the emergency vehicle includes:
a second wireless communication unit configured to transmit or receive the illumination control signal;
a display unit configured to irradiate light; and
a controller configured to control an illumination state of the display unit, and
wherein:
(A) when the first wireless communication unit receives the illumination control signal from the second wireless communication unit, the illumination controller controls the second illumination unit such that the illumination state of the second illumination unit corresponds to the illumination state of the display unit, based on the received illumination control signal, or
(B) when the second wireless communication unit receives the illumination control signal from the first wireless communication unit, the controller controls the display unit such that the illumination state of the display unit corresponds to the illumination state of the second illumination unit, based on the received illumination control signal.

6. A vehicle system which is provided in a first vehicle capable of travelling in an automatic driving mode, the vehicle system comprising:
a first illumination unit configured to irradiate light toward an outside of the first vehicle;
a detector that detects a second vehicle and acquires position information of the second vehicle; and
a vehicle controller configured to, upon detection of a second vehicle, notify the second vehicle by controlling the first illumination unit to irradiate light to the second vehicle based on the position information of the second vehicle, wherein the first illumination unit is configured to irradiate a light pattern which has a ring shape toward the outside of the first vehicle.

* * * * *